United States Patent
Kameda et al.

(10) Patent No.: US 10,048,658 B2
(45) Date of Patent: Aug. 14, 2018

(54) INFORMATION PROCESSING DEVICE, PREDICTIVE CONTROL METHOD, AND RECORDING MEDIUM

(71) Applicant: NEC Corporation, Minato-ku, Tokyo (JP)

(72) Inventors: Yoshio Kameda, Tokyo (JP); Takeo Nozaki, Tokyo (JP); Satoshi Morinaga, Tokyo (JP); Manabu Kusumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 14/914,761

(22) PCT Filed: May 8, 2014

(86) PCT No.: PCT/JP2014/002441
§ 371 (c)(1),
(2) Date: Feb. 26, 2016

(87) PCT Pub. No.: WO2015/037165
PCT Pub. Date: Mar. 19, 2015

(65) Prior Publication Data
US 2016/0209817 A1    Jul. 21, 2016

(30) Foreign Application Priority Data

Sep. 12, 2013  (JP) .................................. 2013-189500

(51) Int. Cl.
G05B 13/04       (2006.01)
G05B 13/02       (2006.01)

(52) U.S. Cl.
CPC ........... *G05B 13/048* (2013.01); *G05B 13/04* (2013.01); *G05B 13/0265* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,663,703 | A | * | 5/1987 | Axelby ............... | G05B 13/048 700/29 |
| 5,519,605 | A | * | 5/1996 | Cawlfield ........... | G05B 13/048 700/31 |

(Continued)

FOREIGN PATENT DOCUMENTS

| JP | H05-120256 A | 5/1993 |
|---|---|---|
| JP | H05-303406 A | 11/1993 |

(Continued)

OTHER PUBLICATIONS

International Search Report for PCT Application No. PCT/JP2014/002441 dated Jul. 29, 2014.

(Continued)

*Primary Examiner* — Kidest Bahta

(57) ABSTRACT

An information processing device according to the present invention, includes: an information accumulation unit which receives and accumulates control-target information that includes information related to a control target and an environment including the control target; a prediction-equation-set learning and generation unit which learns and generates a prediction-equation set to be used for determination of an operation quantity of the control target based on the control-target information accumulated in the information accumulation unit; and an operation-quantity determination unit which receives input information needed for determination of an operation quantity of the control target, constructs a predictive-control model of the control target based on the prediction-equation set, the control-target information accumulated in the information accumulation unit, the control-target information received, and the input information, and determines an operation quantity used for control of the control target.

18 Claims, 20 Drawing Sheets

(56) References Cited

U.S. PATENT DOCUMENTS

| | | | | |
|---|---|---|---|---|
| 8,504,175 B2* | 8/2013 | Pekar | ............. | G05B 13/048 |
| | | | | 700/12 |
| 2011/0264254 A1* | 10/2011 | Nuyan | ............. | D21G 9/0045 |
| | | | | 700/103 |
| 2011/0304723 A1* | 12/2011 | Betzig | ............. | G02B 21/002 |
| | | | | 348/79 |

FOREIGN PATENT DOCUMENTS

| | | |
|---|---|---|
| JP | H05-324007 A | 12/1993 |
| JP | H11-053005 A | 2/1999 |
| JP | 2005-118959 A | 5/2005 |
| JP | 2011-118786 A | 6/2011 |

OTHER PUBLICATIONS

English translation of Written opinion for PCT Application No. PCT/JP2014/002441.
Jan M. Maciejowski (Author), Shuichi Adachi (translation), Masaaki Kanno (translation), "Model Yosoku Seigyo—Seiyaku no Moto deno Saiteki Seigyo", Tokyo Denki University Press, Jan. 2005 ([original article] Jan M. Maciejowski, "Predictive Control with Constraints", Prentice Hall, Aug. 27, 2000), pp. 49-50.

* cited by examiner

INFORMATION PROCESSING DEVICE, PREDICTIVE CONTROL METHOD, AND RECORDING MEDIUM

CROSS-REFERENCE TO RELATED APPLICATIONS

This is a national stage of International Application No. PCT/JP2014/002441 filed on May 8, 2014, claiming priority based on Japanese Patent Application No. 2013-189500 filed on Sep. 12, 2013, the entire contents of which are incorporated herein by reference.

TECHNICAL FIELD

The present invention relates to control of a process or the like, and in particular to predictive control that predicts future states to determine operation quantities.

BACKGROUND ART

Predictive control is control that predicts future controlled quantities on the basis of a dynamic model of a process to determined operation quantities. Features of predictive control include easiness in achieving multivariable control, easiness in taking constraints into consideration, and easiness and intuitiveness in performing adjustment.

Predictive control has been used mainly for plant control in the petrochemical industry. With recent improvement in the performance of computers, predictive control has come to be applied to not only plant control in the petrochemical industry but also moving vehicles and robots, which have short control cycles (for example, refer to NPL 1).

General predictive control, including a technology disclosed in NPL 1, is based on the premise that a predictive-control model reflecting a real world is known, and a designer of the predictive-control model describes the predictive-control model in advance (for example, refer to PLT 1). A model prediction control device disclosed in PLT 1 has a known predictive-control model and, on the basis of an evaluation function, performs control that tracks the model. A predictive-control model is often given by a discrete time linear function.

Control devices that learn predictive-control models for control by using neural networks have been used (for example, refer to PLT 2). A control device disclosed in PLT 2 has an identification device that calculates parameters of an identification model (equivalent to the above-described predictive-control model). However, the control device disclosed in PLT 2 is also based on the premise that a predictive-control model is known.

Methods to learn parameters of a predictive-control model have been proposed (for example, refer to PLT 3). A method disclosed in PLT 3 is also based on the premise that a predictive-control model is known, and estimates parameters under the premise.

For power-assisted systems or the like, systems, which operate by selecting a control algorithm out of a plurality of fixed control algorithms to suit variation between individuals, have been proposed (for example, refer to PLT 4).

Devices using machine learning have also been proposed (for example, refer to PLT 5).

CITATION LIST

Patent Literature

[PLT 1] Japanese Unexamined Patent Application Publication No. H05 (1993)-120256
[PLT 2] Japanese Unexamined Patent Application Publication No. H05 (1993)-324007
[PLT 3] Japanese Unexamined Patent Application Publication No. H11 (1999)-053005
[PLT 4] Japanese Unexamined Patent Application Publication No. 2005-118959
[PLT 5] Japanese Unexamined Patent Application Publication No. 2011-118786

Non Patent Literature

[NPL 1] Jan M. Maciejowski (Author), Shuichi Adachi (translation), Masaaki Kanno (translation), "Model Yosoku Seigyo—Seiyaku no Moto deno Saiteki Seigyo", Tokyo Denki University Press, January, 2005 ([original article] Jan M. Maciejowski, "Predictive Control with Constraints", Prentice Hall, Aug. 27, 2000)

SUMMARY OF INVENTION

Technical Problem

As described above, the model predictive control technologies disclosed in NPL 1, PLTs 1 to 3, and PLT 5 (hereinafter, referred to as "predictive control disclosed in the cited literature") are based on the premise that predictive-control models are known.

For predictive control, it has been a common practice that a designer of the predictive control describes a predictive-control model in advance on the basis of physical laws, such as an equation of motion, a thermal equation, the law of conservation of mass, the law of conservation of momentum, and the law of conservation of energy.

However, it is difficult for a designer to derive a predictive-control model in such a way that the model thoroughly reflects complicated correlations in a real world by taking into consideration all physical laws. Therefore, deviation is caused between the predictive-control model and a real world. As a result, the described predictive-control model becomes an incomplete predictive-control model.

For example, in the case of air-conditioning control of a room, a plurality of operation variables, such as temperature setting to an air conditioner, air volume from the air conditioner, a degree of blind opening, and a degree of window opening, give influence on a plurality of control variables, such as indoor temperature and indoor humidity. In general, interference exists between control variables, such as when temperature is raised, humidity falls. Further, state variables, such as outside air temperature and outside air humidity, give influence on control variables. As described above, it is difficult for a designer to thoroughly model relationships in which operation variables, control variables, and state variables give influence on one another. As a result, there has been a problem in that the predictive control has a low tracking capability for control.

There has also been a problem in that predictive control described in the cited literature is basically incapable of deriving predictive-control models for phenomena that are not based on physical laws, such as actions and behavior of a human being and economic conditions, and it is thus impossible to perform predictive control itself.

Furthermore, in predictive control, a predictive-control model deviates from a real world substantially over time because of changes in an environment (surroundings or surrounding environment), changes in the performance of a control target due to aging, or changes in the structure of a control target due to a repair of the control target or the like. Therefore, a predictive-control model in a prediction technology changes to an incomplete predictive-control model. As a result, in predictive control, there has been a problem in that tracking capability for control decreases.

In the case of a method to construct a predictive-control model by using machine learning, it is important to collect learning data before it becomes ready to perform learning, such as before the point of time at which learning is started.

In performing control using machine learning, since the characteristics of control changes every time learning is performed, it is required to evaluate characteristics of a control model each time. On the basis of the evaluation, it is determined whether or not proper control is performed. Therefore, there has been a problem in that, in the control using machine learning disclosed in the cited literature, it is difficult to select proper control on the basis of the conditions of the surroundings.

An object of the present invention is to provide an information processing device and a predictive control method that solve the above-described problems.

Solution to Problem

An information processing device according an aspect of the present invention, includes: an information accumulation unit which receives and accumulates control-target information that includes information related to a control target and an environment including the control target; a prediction-equation-set learning and generation unit which learns and generates a prediction-equation set to be used for determination of an operation quantity of the control target based on the control-target information accumulated in the information accumulation unit; and an operation-quantity determination unit which receives input information needed for determination of an operation quantity of the control target, constructs a predictive-control model of the control target based on the prediction-equation set, the control-target information accumulated in the information accumulation unit, the control-target information received, and the input information, and determines an operation quantity used for control of the control target.

A predictive control method according to an aspect of the present invention includes: receiving control-target information including information related to a control target and an environment including the control target and accumulating the control-target information; learning and generating a prediction-equation set to be used for determination of an operation quantity of the control target based on the accumulated control-target information; and receiving input information needed for determination of an operation quantity of the control target, constructing a predictive-control model of the control target based on the prediction-equation set, the control-target information accumulated, the control-target information received, and the input information, and determining an operation quantity used for control of the control target.

A non-transitory computer-readable recording medium according to an aspect of the present invention embodying a program, the program causing an information processing device to perform a method, the method includes: receiving control-target information including information related to a control target and an environment including the control target and accumulating the control-target information; learning and generating a prediction-equation set to be used for determination of an operation quantity of the control target based on the accumulated control-target information; and receiving input information needed for determination of an operation quantity of the control target, constructing a predictive-control model of the control target based on the prediction-equation set, the accumulated control-target information, the control-target information received, and the input information, and determining an operation quantity used for control of the control target.

An information processing device according to an aspect of the present invention, includes: a predictive control unit that includes: information accumulation unit which receives and accumulates control-target information including information related to a control target and an environment including the control target; a prediction-equation-set learning and generation unit which learns and generates a prediction-equation set used for determination of an operation quantity of the control target based on the control-target information accumulated in the information accumulation unit; and an operation-quantity determination unit which receives input information required for determination of an operation quantity of the control target, constructing a predictive-control model of the control target based on the input information, control-target information accumulated in the information accumulation unit, and the prediction-equation set, and determining a first operation quantity used for control of the control target, and outputs the first operation quantity; a fixed control unit which determines a second operation quantity to be used for control of the control target based on an equation that is inputted in advance and the control-target information accumulated in the information accumulation unit and outputting the second operation quantity determined; and an operation-quantity selection unit which selects either the first operation quantity from the operation-quantity determination unit or the second operation quantity from the fixed control unit.

A predictive control method according to an aspect of the present invention includes: receiving and accumulating control-target information including information related to a control target and an environment including the control target; learning and generating a prediction-equation set used for determination of an operation quantity for the control target based on the accumulated control-target information; receiving input information required for determination of an operation quantity of the control target, constructing a predictive-control model of the control target based on the input information, the accumulated control-target information, and the prediction-equation set, and determining a first operation quantity used for control of the control target; outputting the first operation quantity; determining a second operation quantity used for control of the control target based on an equation that is inputted in advance and the control-target information accumulated and outputting the second operation quantity determined; and selecting either the first operation quantity or the second operation quantity.

A non-transitory computer-readable recording medium according to an aspect of the present invention embodying a program, the program causing an information processing device to perform a method, the method includes: receiving and accumulating control-target information including information related to a control target and an environment including the control target; learning and generating a prediction-equation set used for determination of an operation quantity for the control target based on the accumulated control-target information; receiving input information required for determination of an operation quantity of the control target, constructing a predictive-control model of the control target based on the input information, the accumulated control-target information, and the prediction-equation set, and determining a first operation quantity used for control of the control target; outputting the first operation quantity; determining a second operation quantity used for control of the control target based on an equation that is inputted in advance and the control-target information accumulated and outputting the second operation quantity determined; and selecting either the first operation quantity or the second operation quantity.

Advantageous Effects of Invention

According to the present invention, it is possible to achieve an advantageous effect of constructing a predictive-control model automatically so as to reduce deviation between the predictive-control model and a real world.

According to the present invention, it is also possible to perform collection of learning data and control at the same time.

DESCRIPTION OF EMBODIMENTS

Figure 1:
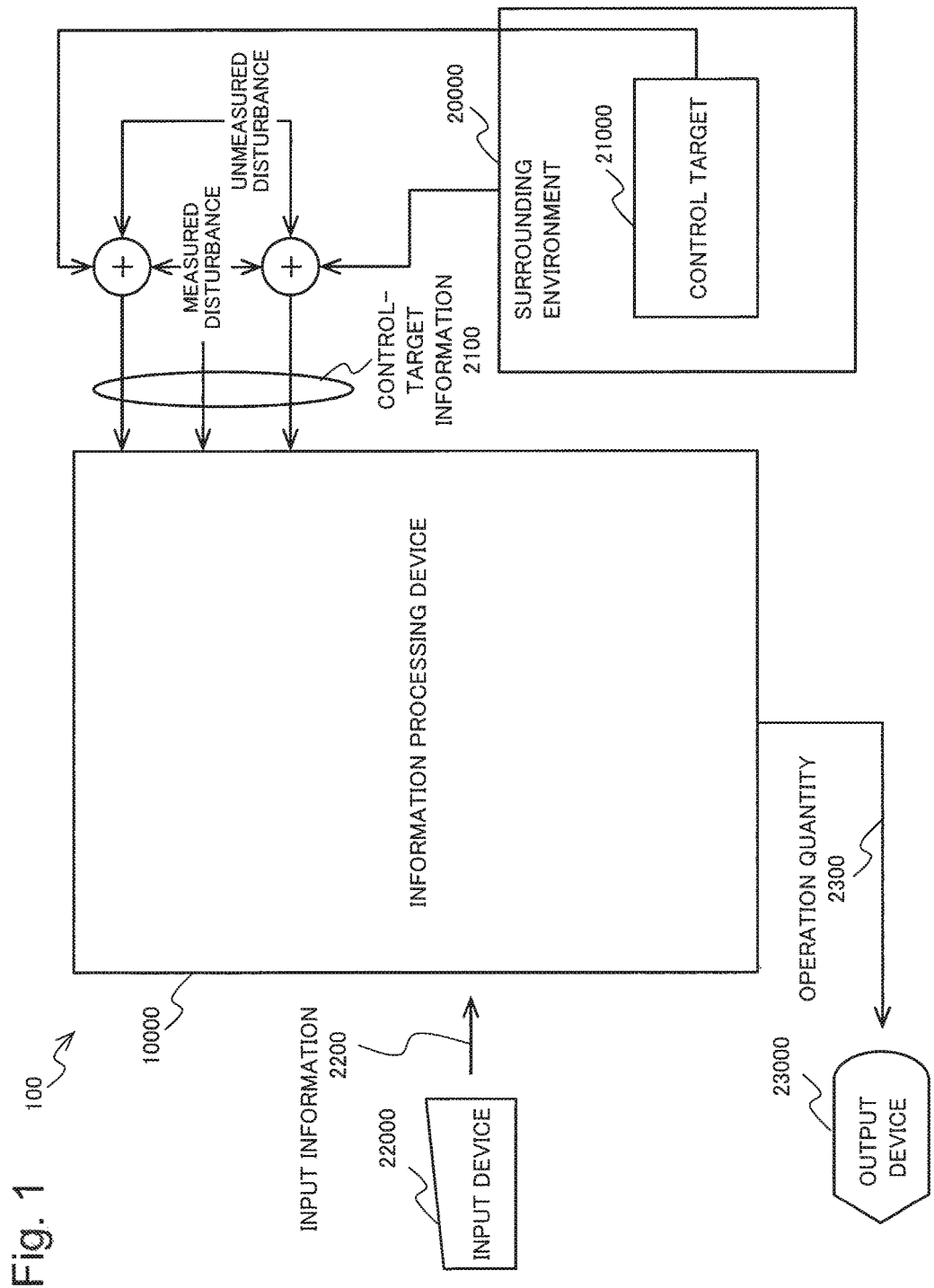
FIG. 1 is a block diagram illustrating an example of a configuration of an information processing system that includes an information processing device according to a first exemplary embodiment of the present invention.

Next, exemplary embodiments of the present invention will be described with reference to the accompanying drawings.

The respective drawings are for a description of the exemplary embodiments of the present invention. Thus, the present invention is not limited to the illustrations in the respective drawings. The same components in the respective drawings are provided with the same reference numbers and duplicate descriptions thereof may be omitted.

In the drawings used in the following description, descriptions and/or illustrations of portions irrelevant to the description of the present invention may be omitted.

First Exemplary Embodiment

FIG. 1 is a block diagram illustrating an example of a configuration of an information processing system 100 that includes an information processing device 10000 of a first exemplary embodiment in the present invention.

The information processing system 100 includes the information processing device 10000, an input device 22000, and an output device 23000.

The information processing device 10000 performs processing for predictive control of a control target 21000 included in a surrounding environment 20000. For this purpose, the information processing device 10000 receives information related to the surrounding environment 20000 and the control target 21000. However, various disturbances are added to the respective information in measuring values thereof. The disturbances include a "measured disturbance", which is measurable, and an "unmeasured disturbance", which is unmeasurable. Therefore, the information processing device 10000 receives the following information as information related to the control target 21000 and the surrounding environment 20000, as illustrated in FIG. 1. That is, the information processing device 10000 receives information in which a measured disturbance and an unmeasured disturbance are added to the information on the surrounding environment 20000, information in which the measured disturbance and the unmeasured disturbance are added to the information on the control target 21000, and the measured disturbance (hereinafter, collectively referred to as "control-target information 2100").

The information on the control target 21000 mentioned above includes, for example, a state of the control target 21000, an operation applied to the control target 21000, or a cost required to achieve the operation.

The information processing device 10000 is connected with the input device 22000 to receive information required to perform predictive control (for example, setting values, constraints, and priorities, and, hereinafter, simply referred to as "input information 2200") from the input device 22000. There is no limitation to the input device 22000 as long as the input device 22000 is a device by which a designer is able to input required information. For example, the input device 22000 may be a commonly-used PC (Personal Computer). Thus, a detailed description of the input device 22000 will be omitted.

The information processing device 10000 is also connected with the output device 23000 to output determined information required to operate the control target 21000 (hereinafter, simply referred to as "operation quantity 2300") to the output device 23000. There is no limitation to the output device 23000 as long as the designer is able to confirm the operation quantity 2300. For example, the output device 23000 may be a commonly-used display device. Thus, a detailed description of the output device 23000 will be omitted.

The input device 22000 and the output device 23000 may be either different devices or the same device.

Next, the information processing device 10000 of the exemplary embodiment will be described in detail with reference to the accompanying drawings.

Figure 2:
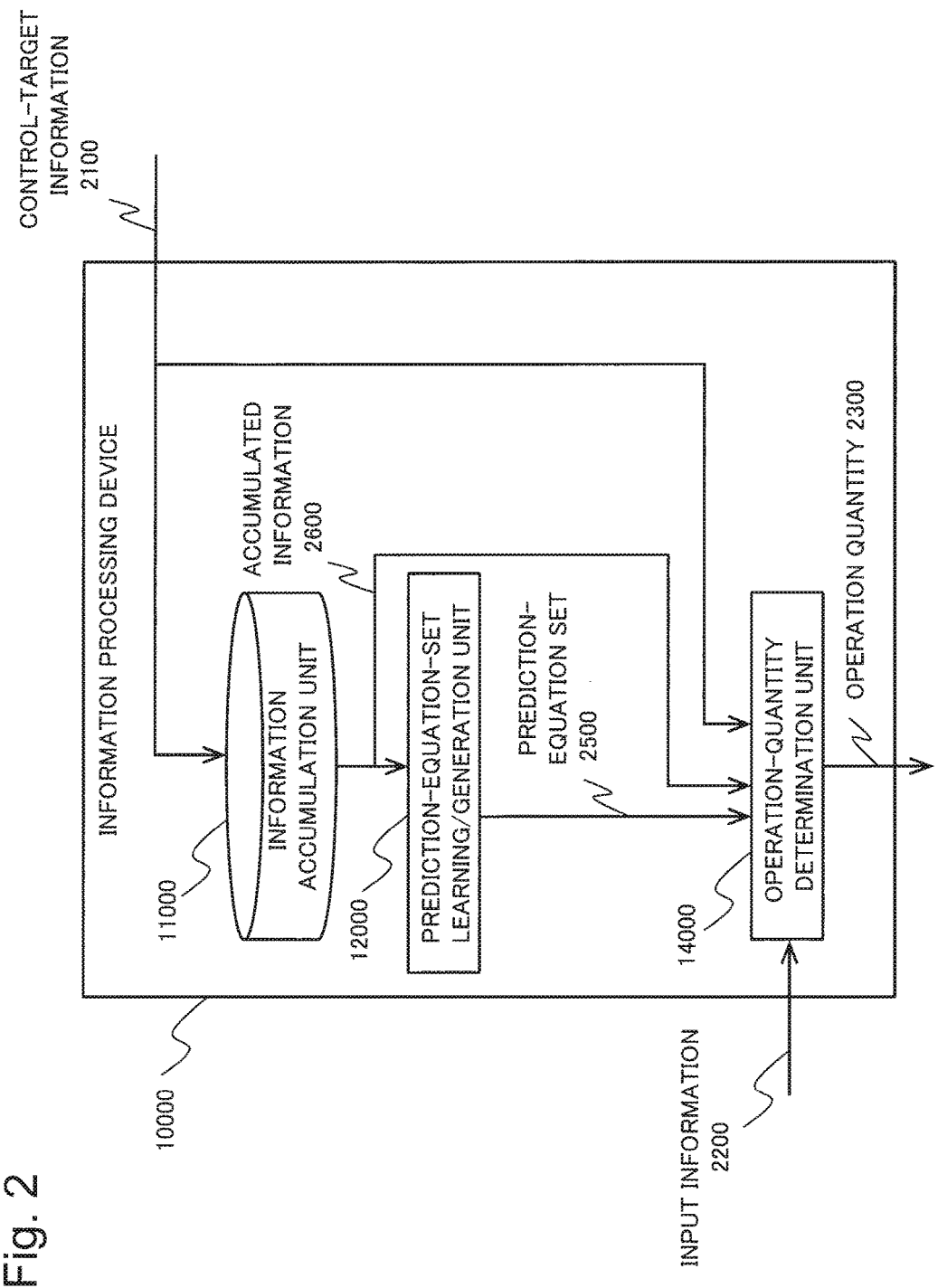
FIG. 2 is a block diagram illustrating an example of a configuration of the information processing device according to the first exemplary embodiment.

FIG. 2 is a block diagram illustrating an example of a configuration of the information processing device 10000 according to the first exemplary embodiment.

The information processing device 10000 includes an information accumulation unit 11000, a prediction-equation-set learning and generation unit 12000, and an operation-quantity determination unit 14000.

The information accumulation unit 11000 receives and accumulates the control-target information 2100. Hereinafter, information accumulated by the information accumulation unit 11000 will be referred to as "accumulated information 2600".

The prediction-equation-set learning and generation unit 12000 learns (performs machine learning of) a prediction-equation set 2500 that is used for control of the control target 21000 on the basis of the accumulated information 2600 accumulated in the information accumulation unit 11000, that is, control-target information 2100 from a past time to a present time. The prediction-equation-set learning and generation unit 12000 then generates the prediction-equation set 2500 on the basis of the learning. The prediction-equation set 2500 is, for example, a set of prediction equations to predict a future state or cost of the control target 21000.

An operation of the prediction-equation-set learning and generation unit 12000 will be described later.

The operation-quantity determination unit 14000 receives information required to determine the operation quantity 2300, that is, information required to perform predictive control (the above-described input information 2200). For example, the operation-quantity determination unit 14000 may, as described above, receive the input information 2200 required to determine the operation quantity 2300 from the input device 22000.

The input information 2200 is, for example, a setting value, a constraint, and a priority.

The setting value is a tuple of a point of time in the future and a value set to a variable of the predictive-control model that are targeted for control (hereinafter, referred to as a control variable) at the point of time in the future in the control of the control target 21000. The control is performed so that a difference between the value of the control variable and the value set to the control variable targeted for control becomes small at the point of time in the future.

The constraint is a constraint for the control variable of the predictive-control model of the control target 21000, a variable representing the state of the predictive-control model (hereinafter, referred to as a state variable), or a variable representing an operation applied to the predictive-control model (hereinafter, referred to as an operation variable), or a constraint between the control variable, the state variable, and the operation variable.

The prediction equation can also be said to be a function (function equation) with the control variable, the state variable, and the operation variable as variables.

The priority indicates importance of control variables of the predictive-control model for the control target 21000. A control variable with a high priority is targeted for control preferentially.

The operation-quantity determination unit 14000 constructs a predictive-control model on the basis of the following information and determines the operation quantity 2300 of the control target 21000 on the basis of the predictive-control model. That is, the information includes the prediction-equation set 2500 learned and generated by the prediction-equation-set learning and generation unit 12000, the received control-target information 2100, the accumulated information 2600 accumulated in the information accumulation unit 11000, and the input information 2200. The operation quantity 2300 is information that is used for control of the control target 21000. The operation quantity 2300 is, for example, a specific value representing an operation. However, it is assumed that an operation quantity that is not a specific value, such as an instruction for action in an operation, has been converted into a specific value appropriately.

The operation-quantity determination unit 14000 outputs the determined operation quantity 2300 to the output device 23000.

As a consequence, for example, an operator of the control target 21000 is able to operate the control target 21000 properly on the basis of the output information (the operation quantity 2300).

The operation-quantity determination unit 14000 prescribes an association of an independent variable and a dependent variable in the prediction-equation set 2500 that has been obtained on the basis of the machine learning by the prediction-equation-set learning and generation unit 12000 with the control variable, the state variable, and the operation variable of the predictive-control model. The operation-quantity determination unit 14000 constructs a predictive-control model for control using the prediction-equation set 2500 on the basis of the prescription. Further, the information processing device 10000 may construct a predictive-control model by using the input information 2200 (for example, a setting value, a constraint, and a priority) that the operation-quantity determination unit 14000 has received. That is, the information processing device 10000 is capable of constructing a predictive-control model using a prediction-equation set 2500 obtainable on the basis of machine learning.

Operations of the operation-quantity determination unit 14000, including an independent variable and a dependent variable, will be described later.

Next, advantageous effects of the exemplary embodiment will be described.

In the prediction technologies disclosed in the cited literature, a designer clarifies relations between a control target 21000, a surrounding environment 20000 thereof, and a measured disturbance, establishes prediction equations taking into consideration physical laws, and constructs a predictive-control model. In the prediction technologies disclosed in the cited literature, the designer is also required to determine the operation quantity 2300 of the control target 21000 on the basis of the model. Alternatively, the prediction technologies assume that parameters in the prediction equations have been undecided and identify the parameters on the basis of learning.

On the other hand, the information processing device 10000 of the exemplary embodiment provides an advantageous effect in that it becomes possible to perform predictive control without a designer constructing a predictive-control model.

That is because, in the information processing device 10000 of the exemplary embodiment, the prediction-equation-set learning and generation unit 12000 automatically learns and generates the prediction-equation set 2500 on the basis of accumulated information 2600 accumulated in the information accumulation unit 11000. That is also because the operation-quantity determination unit 14000 automatically constructs a predictive-control model and determines the operation quantity 2300 on the basis of control-target information 2100, input information 2200, the accumulated information 2600, and the prediction-equation set 2500.

As described above, the information processing device 10000 of the exemplary embodiment provides an advantageous effect in that it becomes possible to perform predictive control without a designer constructing a predictive-control model.

Furthermore, with the exemplary embodiment of the present invention, the information processing device 10000 is capable of constructing a predictive-control model that uses a prediction-equation set 2500 obtainable through machine learning.

In the predictive control disclosed in the cited literature, an association of an independent variable and a dependent variable in prediction equations that have been obtained by simply applying machine learning with an operation variable, a control variable, and a state variable that are used in a predictive-control model for control is not prescribed. In consequence, there has been a problem in that prediction technologies in the predictive control are incapable of constructing a predictive-control model for control from obtained prediction equations, and also incapable of constructing a predictive-control model for control with a setting value, a constraint, a priority, or the like being provided from the outside.

According to the exemplary embodiment of the present invention, the information processing device 10000 prescribes an association of an independent variable and a dependent variable in the prediction-equation set 2500 that has been obtained through machine learning performed by the prediction-equation-set learning and generation unit 12000 with a control variable and an operation variable of a control model. On the basis of the prescription, the information processing device 10000 constructs a predictive-control model for control using the prediction-equation set 2500. Further, the information processing device 10000 uses input information 2200 that the operation-quantity determination unit 14000 has received. With this configuration, the above-described problem is solved.

Moreover, the information processing device 10000 also enables application of predictive control to a control target 21000 that designers are unable to derive or a phenomenon that is not based on physical laws.

That is because the prediction-equation-set learning and generation unit 12000 of the information processing device 10000 generates the prediction-equation set 2500 on the basis of accumulated information 2600. That is also because the operation-quantity determination unit 14000 is capable of determining an operation quantity 2300 on the basis of the control-target information 2100, the accumulated information 2600, and the prediction-equation set 2500. In other words, that is because the information processing device 10000 is capable of determining the operation quantity 2300 without using any physical law.

Furthermore, the information processing device 10000 becomes capable of performing predictive control that is able to cope with changes in the surrounding environment 20000 and the control target 21000.

That is because the prediction-equation-set learning and generation unit 12000 and the operation-quantity determination unit 14000 use the accumulated information 2600, which is past control-target information 2100, in addition to the control-target information 2100. In other words, that is because, in the information processing device 10000, the prediction-equation-set learning and generation unit 12000 constructs the predictive-control model (the prediction-equation set 2500) automatically by using machine learning so as to decrease deviation between the predictive-control model and a real world. That is also because the operation-quantity determination unit 14000 determines the operation quantity 2300 in the predictive control by using the constructed predictive-control model (the prediction-equation set 2500).

Furthermore, the information processing device 10000 is capable of achieving predictive control using prediction equations.

That is because the prediction-equation-set learning and generation unit 12000 learns and generates the prediction-equation set 2500, and the operation-quantity determination unit 14000 uses the learned and generated prediction-equation set 2500.

As a result, the information processing device 10000 of the exemplary embodiment is able to provide an advantageous effect of increasing tracking capability of predictive control.

<First Variation>

The information processing device 10000 of the exemplary embodiment has no limit to the number of control targets 21000.

Figure 3:
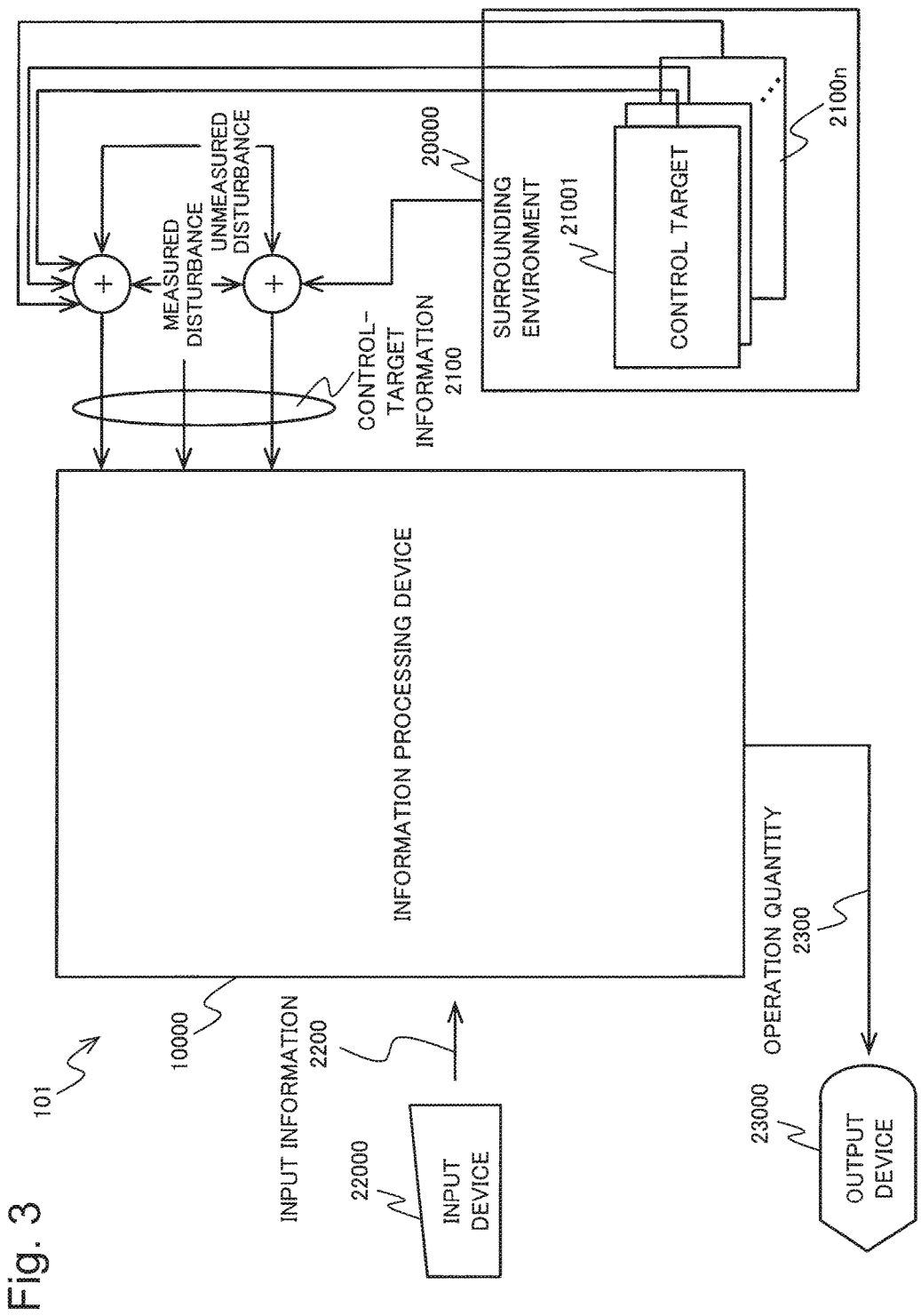
FIG. 3 is a block diagram illustrating an example of another configuration of the information processing system that includes the information processing device according to the first exemplary embodiment.

FIG. 3 is a block diagram illustrating an example of a configuration of an information processing system 101 according to a first variation.

The information processing system 101 includes a plurality of control targets 21001 to 2100$n$ as control targets 21000.

The information processing device 10000 may be implemented with respect to each control target 21000.

However, the information processing device 10000 is able to cope with even a plurality of control targets 21000.

Thus, an information processing device 10000 of the variation receives control-target information 2100 related to a plurality of control targets 21000, and determines the operation quantities 2300 of the plurality of control targets 21000.

When one information processing device 100000 controls a plurality of control targets 21000, the information processing device 10000 is able to control the plurality of control targets 21000 in a centralized manner. In other words, the information processing device 10000 is capable of achieving control of a plurality of control targets 21000 easily.

Since a lot of information related to the control targets 21000 can be accumulated in the information accumulation unit 11000, the information processing device 10000 is capable of improving prediction accuracy of the prediction-equation set 2500 that the prediction-equation-set learning and generation unit 12000 generates.

Further, since the information processing device 10000 of the variation is capable of controlling a plurality of the control targets 21000 with an amount of resources of one control device, a low amount of resources for a control device can be achieved.

Advantageous effects of the variation will be described.

The information processing device 10000 of the variation is able to provide an advantageous effect of simplifying control of a plurality of the control targets 21000 in addition to the advantageous effects of the information processing device 10000 of the first exemplary embodiment.

That is because the information processing device 10000 is capable of controlling a plurality of the control targets 21000 in a centralized manner.

Further, the information processing device 10000 enables an improvement in prediction accuracy of the prediction-equation set 2500.

That is because the information processing device 10000 is capable of accumulating more information related to the control targets 21000.

Furthermore, the information processing device 10000 is able to provide an advantageous effect of reducing an amount of resources required for control.

That is because the information processing device 10000 enables a reduction in the number of devices required for the control targets 21000.

<Second Variation>

The information processing system 100 may transmit the operation quantity 2300 that the information processing device 10000 determines to the control target 21000.

Figure 4:
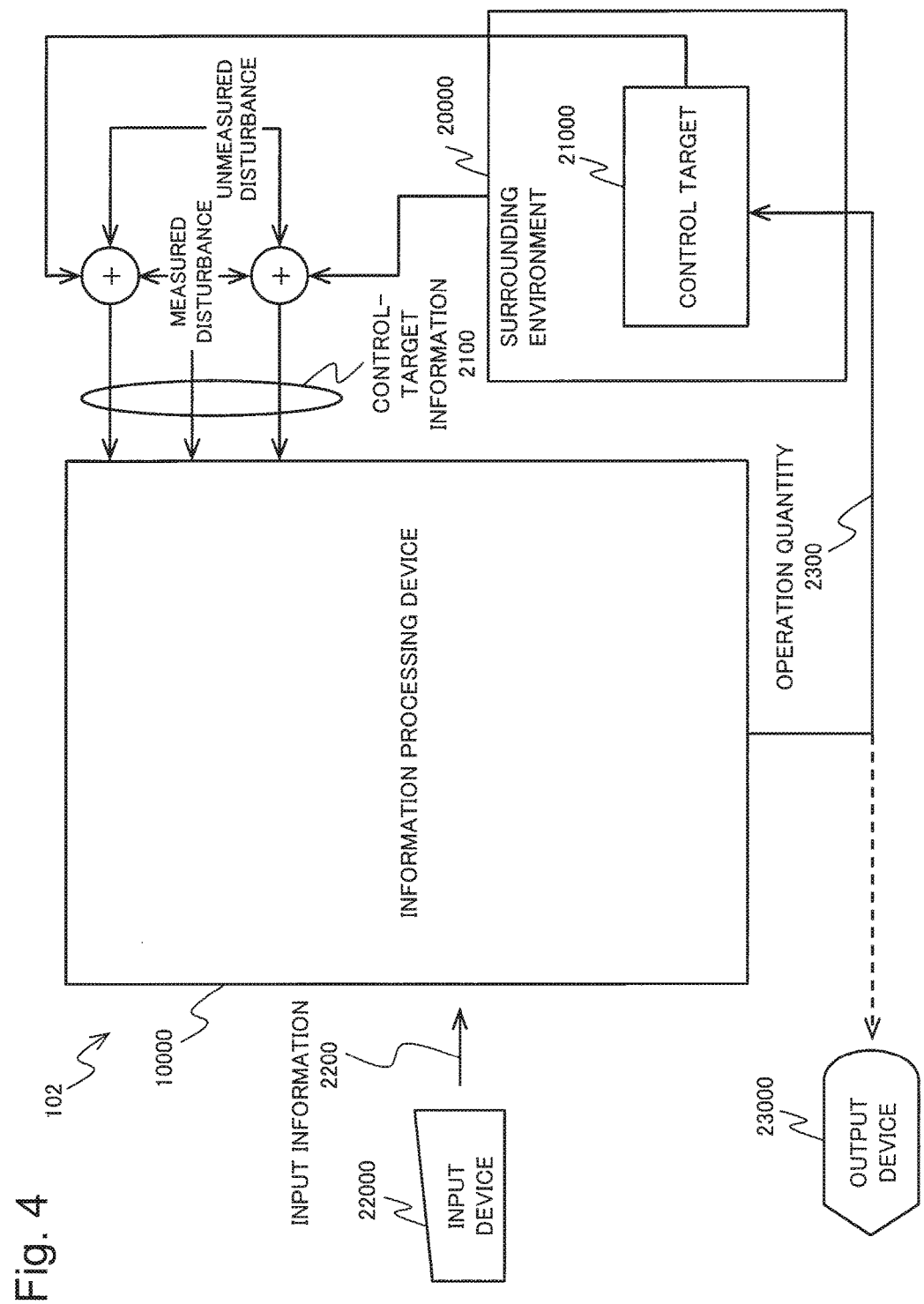
FIG. 4 is a block diagram illustrating an example of further another configuration of the information processing system that includes the information processing device according to the first exemplary embodiment.

FIG. 4 is a block diagram illustrating an example of a configuration of an information processing system 102 according to a second variation.

An information processing device 10000 transmits the operation quantity 2300 that are determined by an operation-quantity determination unit 14000 to a control target 21000.

The control target 21000 performs an operation based on the received operation quantity 2300.

As described above, the information processing device 10000 may perform feedback of the operation quantity automatically.

An advantageous effect of the variation will be described.

The information processing device 10000 of the variation provides an advantageous effect of reducing a load on operators in addition to the advantageous effects of the first exemplary embodiment.

That is because the information processing device 10000 is capable of feeding back the determined operation quantity 2300 to the control target 21000 automatically.

The information processing device 10000 of the variation may output the operation quantity 2300 to an output device 23000 in a similar manner to the first exemplary embodiment to enable an operator to confirm the operation quantity 2300.

Further, the information processing device 10000 of the variation may, as with the first variation, be connected with a plurality of the control targets 21000.

<Third Variation>

The configuration of an information processing device 10000 is not limited to the configurations described thus far.

The information processing device 10000 may be configured by grouping respective components into a plurality of sub-configurations.

The information processing device 10000 does not have to be configured with a single device. For example, the information processing device 10000 may use an external storage device that is connected via a network or a bus as the information accumulation unit 11000.

Further, at least a portion of the configuration of the information processing device 10000 may be installed at a place different from a place where the control target 21000 resides.

For example, the information accumulation unit 11000 and the prediction-equation-set learning and generation unit 12000 of the information processing device 10000 may be placed in a building different from a building where the control target 21000 is placed.

The information accumulation unit 11000 and the prediction-equation-set learning and generation unit 12000 of the information processing device 10000 may be placed in a country different from a country where the control target 21000 is placed.

Alternatively, the information processing device 10000 may be connected with a plurality of the control targets 21000 that are placed in a distributed manner.

The information processing device 10000 may be configured as a single entity into which a plurality of configurations are integrated.

For example, the information processing device 10000 may be achieved as a computer device that includes a CPU (Central Processing Unit), a ROM (Read Only Memory), and a RAM (Random Access Memory). Further, the information processing device 10000 may be achieved as a computer device that includes an input output circuit (IOC) and a network interface circuit (NIC) in addition to the above-described configuration.

Figure 5:
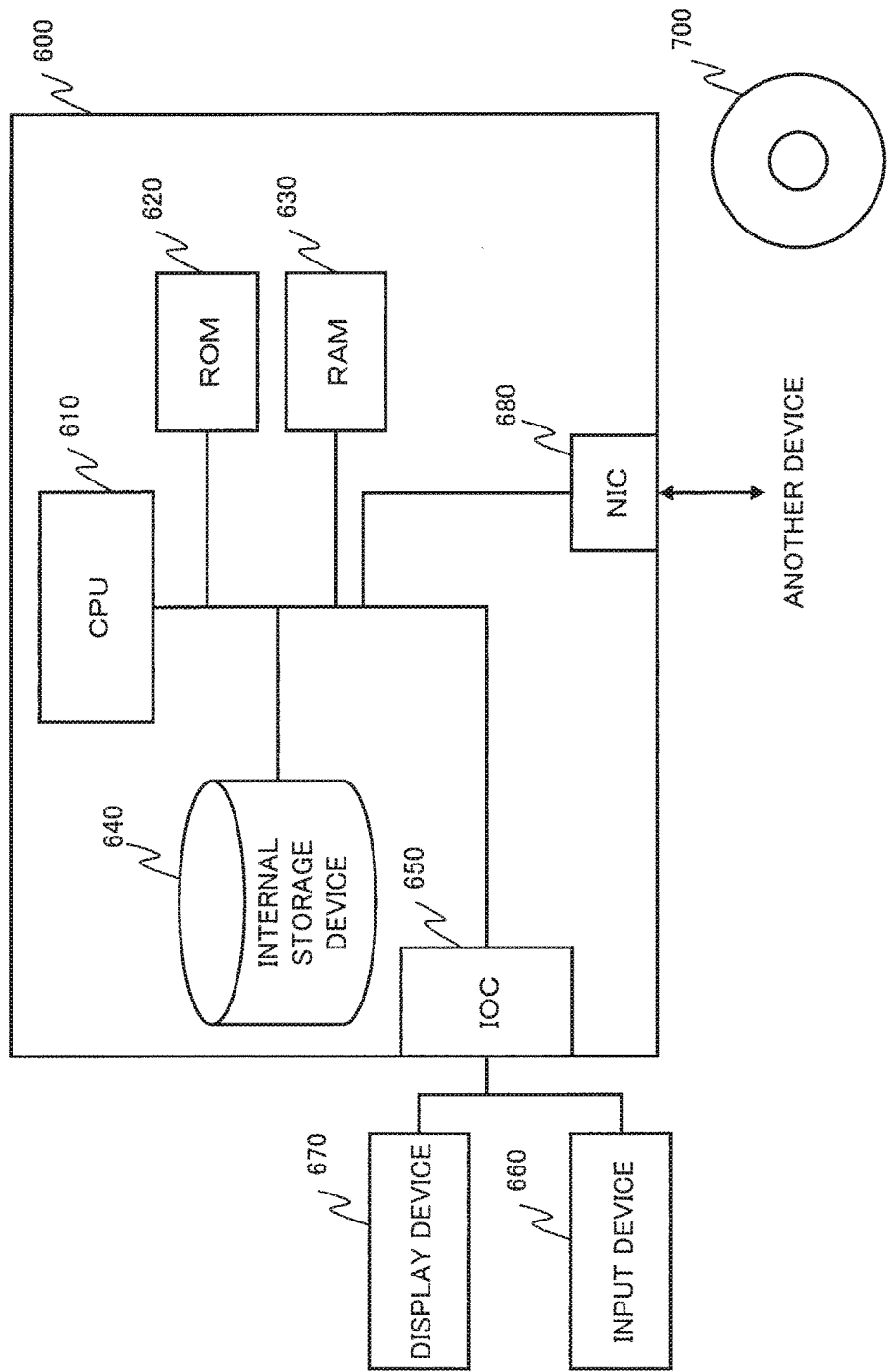
FIG. 5 is a block diagram illustrating an example of a configuration of a variation of the information processing device according to the first exemplary embodiment.

FIG. 5 is a block diagram illustrating an example of a configuration of an information processing device 600 according to a third variation.

The information processing device 600 includes a CPU 610, a ROM 620, a RAM 630, an internal storage device 640, an IOC 650, and a NIC 680 to configure a computer.

The CPU 610 reads programs from the ROM 620. Then, the CPU 610 controls the RAM 630, the internal storage device 640, the IOC 650, and the NIC 680 on the basis of the read programs. The CPU 610 controls the components to achieve respective functions as the prediction-equation-set learning and generation unit 12000 and the operation-quantity determination unit 14000 illustrated in FIG. 2. The CPU 610 may use the RAM 630 or the internal storage device 640 as a temporary storage for the programs in achieving the respective functions.

The CPU 610 may read programs included in a storage medium 700 that stores the programs in a computer-readable manner by using a not-illustrated storage medium reading device. Alternatively, the CPU 610 may receive programs from a not-illustrated external device via the NIC 680.

The ROM 620 stores programs that the CPU 610 executes and static data. The ROM 620 is, for example, a P-ROM (Programmable-ROM) or a flash ROM.

The RAM 630 temporarily stores programs that the CPU 610 executes and data. The RAM 630 is, for example, a D-RAM (Dynamic-RAM).

The internal storage device 640 stores data and programs that the information processing device 600 saves on a long-term basis. The internal storage device 640 may operate as a transitory storage device for the CPU 610. The internal storage device 640 is, for example, a hard disk device, a magneto optical disk, an SSD (Solid State Drive), or a disk array device.

The RAM 630 or the internal storage device 640 achieves functions as the information accumulation unit 11000.

The information processing device 600 may achieves functions of the information accumulation unit 11000 by using both the RAM 630 and the internal storage device 640.

As described above, the information accumulation unit 11000 may be achieved using either a transitory memory or a non-transitory memory.

The IOC 650 mediates data between the CPU 610 and an input device 660 and between the CPU 610 and a display device 670. The IOC 650 is, for example, an IO interface card.

The input device 660 is a device that receives input instructions from an operator of the information processing device 600. The input device 660 is, for example, a keyboard, a mouse, or a touch screen.

The input device 660 of the information processing device 600 may operate as a portion of the input device 22000. That is, the information processing device 600 may include functions of the input device 22000.

The display device 670 is a device that displays information for the operator of the information processing device 600. The display device 670 is, for example, a liquid crystal display.

The display device 670 of the information processing device 600 may operate as a portion of the output device 23000. That is, the information processing device 600 may include functions of the output device 23000.

The NIC 680 relays data exchange with external devices (for example, the input device 22000 and the output device 23000) via a network. The NIC 680 is, for example, a LAN (Local Area Network) card.

The information processing device 600 configured as described above is able to provide the same advantageous effects as the information processing device 10000.

That is because the CPU 610 of the information processing device 600 is capable of achieving the same functions as the information processing device 10000 on the basis of programs.

Second Exemplary Embodiment

Figure 6:
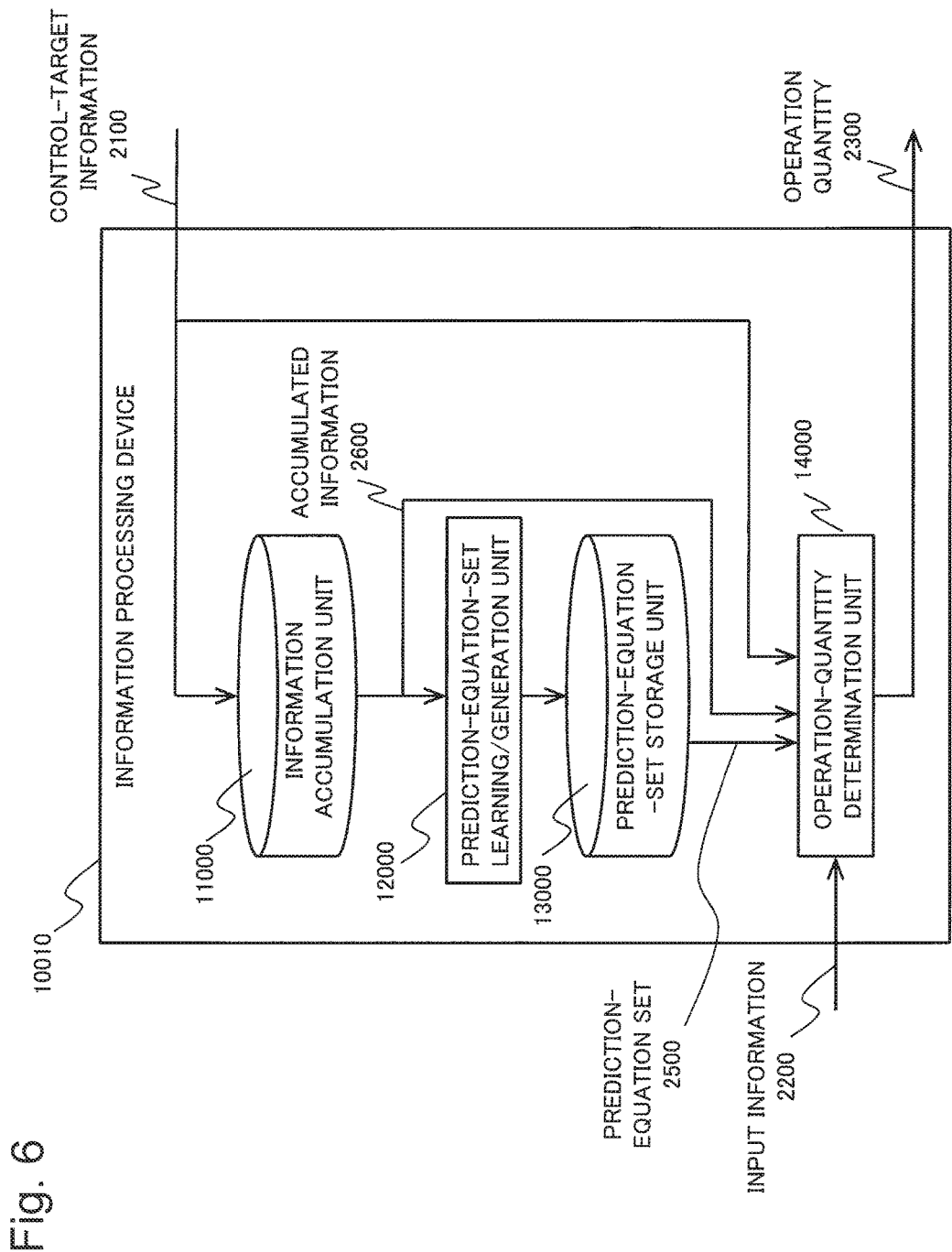
FIG. 6 is a block diagram illustrating an example of a configuration of an information processing device according to a second exemplary embodiment.

FIG. 6 is a block diagram illustrating an example of a configuration of an information processing device 10010 according to a second exemplary embodiment.

The information processing device 10010 of the exemplary embodiment includes a prediction-equation-set storage unit 13000 between the prediction-equation-set learning and generation unit 12000 and the operation-quantity determination unit 14000 in addition to the configuration of the information processing device 10000 of the first exemplary embodiment. The configurations of the rest of the information processing device 10010 are similar as the information processing device 10000. Therefore, in the exemplary embodiment, configurations and operations differing from the first exemplary embodiment will be described, and descriptions of the same configurations and operations as the first exemplary embodiment will be omitted.

The prediction-equation-set storage unit 13000 stores the prediction-equation set 2500 that has been learned and generated by the prediction-equation-set learning and generation unit 12000. Hereinafter, including the prediction-equation set that the prediction-equation-set storage unit 13000 inputs, outputs, and stores, the set of prediction-equations will be referred to as the prediction-equation set 2500.

An operation-quantity determination unit 14000 of the exemplary embodiment determines the operation quantity 2300 of the control target 21000 on the basis of the prediction-equation set 2500 stored in the prediction-equation-set storage unit 13000, the received control-target information 2100, the accumulated information 2600, and the input information 2200.

In the information processing device 10000 of the first exemplary embodiment, the prediction-equation-set learning and generation unit 12000 and the operation-quantity determination unit 14000 operate continuously.

On the other hand, in the information processing device 10010 of the exemplary embodiment, the prediction-equation-set learning and generation unit 12000 and the operation-quantity determination unit 14000 do not have to operate continuously.

For example, when determination of the operation quantity is performed more frequently than update of the prediction-equation set, the prediction-equation-set learning and generation unit 12000 may operate in a longer time interval than an operation interval of the operation-quantity determination unit 14000.

For example, there is a case in which, while the operation interval of the operation-quantity determination unit 14000 is set at one second, the operation interval of the prediction-equation-set learning and generation unit 12000 is set at one day. In such a case, the prediction-equation-set storage unit 13000 absorbs a difference between the operation interval of the prediction-equation-set learning and generation unit 12000 and the operation interval of the operation-quantity determination unit 14000. For that purpose, the prediction-equation-set storage unit 13000 receives the prediction-equation set 2500 that has been learned and generated by the prediction-equation-set learning and generation unit 12000 and stores the received prediction-equation set 2500.

The operation-quantity determination unit 14000 is able to use the prediction-equation set 2500 stored in the prediction-equation-set storage unit 13000 in determining the operation quantity 2300. Therefore, the prediction-equation-set learning and generation unit 12000 of the exemplary embodiment does not have to learn and generate the prediction-equation set 2500 every time the operation-quantity determination unit 14000 determines the operation quantity 2300. That is, the prediction-equation-set learning and generation unit 12000 of the exemplary embodiment enables a reduction in the amount of calculation.

An advantageous effect of the exemplary embodiment will be described.

The information processing device 10010 of the exemplary embodiment is able to provide an advantageous effect in that the amount of calculation can be reduced in addition to the advantageous effects of the first exemplary embodiment.

The reason for the advantageous effect is as follows.

The operation-quantity determination unit 14000 uses the prediction-equation set 2500 stored in the prediction-equation-set storage unit 13000 in determining the operation quantity 2300. Therefore, the prediction-equation-set learning and generation unit 12000 of the exemplary embodiment does not have to learn and generate a prediction-equation set 2500 every time the operation-quantity determination unit 14000 determines the operation quantity 2300. That is, the prediction-equation-set learning and generation unit 12000 of the exemplary embodiment enables a reduction in the amount of calculation.

The information processing device 10010 of the exemplary embodiment may, as with the first exemplary embodiment, cope with a plurality of the control targets 21000.

The information processing device 10010 of the exemplary embodiment may, as with the first exemplary embodiment, be achieved by the computer illustrated in FIG. 5.

Third Exemplary Embodiment

Figure 7:
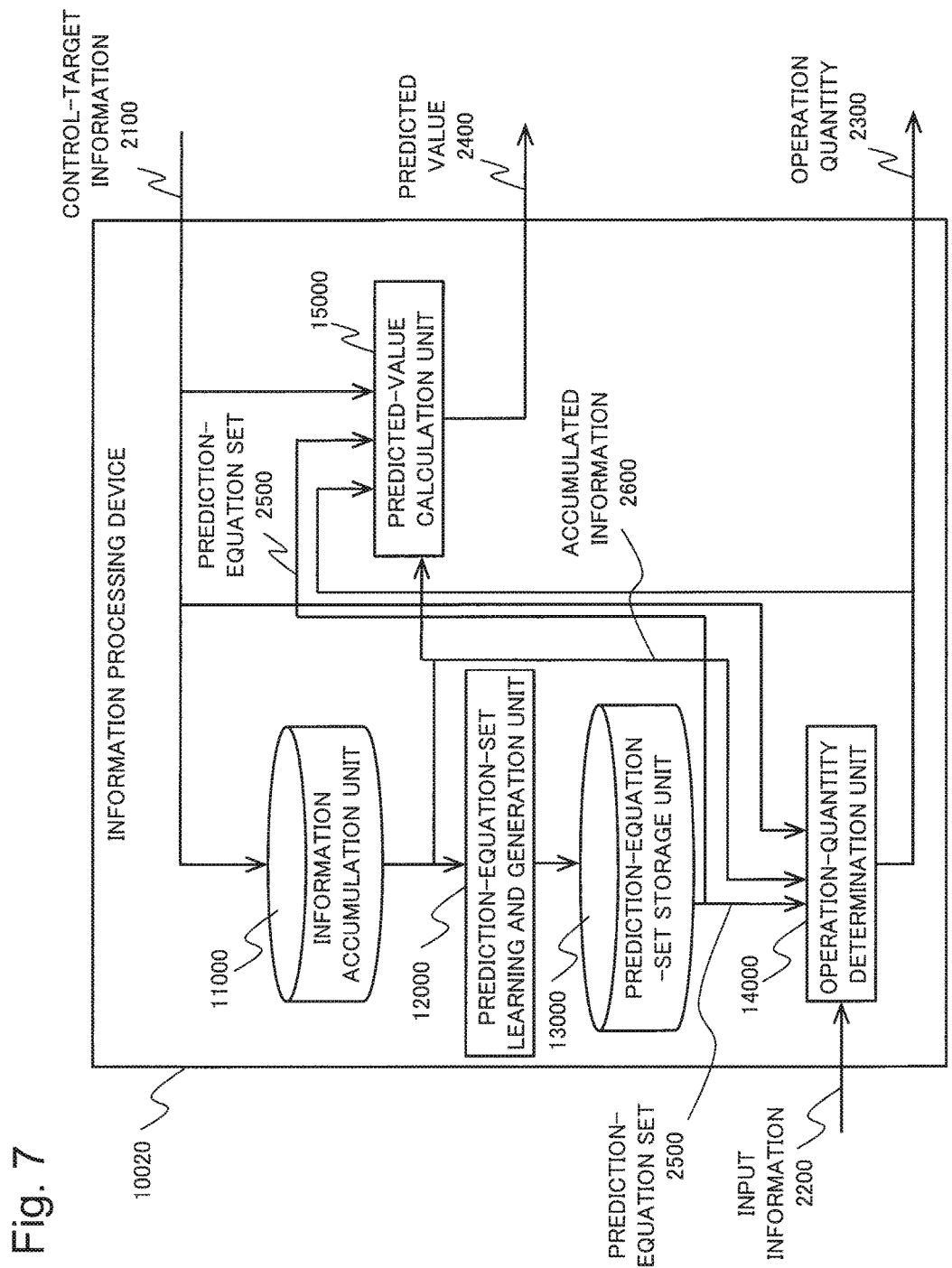
FIG. 7 is a block diagram illustrating an example of a configuration of an information processing device according to a third exemplary embodiment.

FIG. 7 is a block diagram illustrating an example of a configuration of an information processing device 10020 according to a third exemplary embodiment.

The information processing device 10020 of the exemplary embodiment includes a predicted-value calculation unit 15000 in addition to the configurations of the information processing device 10010 of the second exemplary embodiment. The configurations of the rest of the information processing device 10020 are similar as the information processing device 10010. Thus, in the exemplary embodiment, configurations and operations differing from the second exemplary embodiment will be described, and descriptions of the same configurations and operations as the second exemplary embodiment will be omitted. The information processing device 10020 does not have to include a prediction-equation-set storage unit 13000, as with the information processing device 10000 of the first exemplary embodiment.

The predicted-value calculation unit 15000 calculates a predicted value 2400 on the basis of the prediction-equation set 2500 stored in a prediction-equation-set storage unit 13000, the control-target information 2100, and the operation quantity 2300. For example, the predicted-value calculation unit 15000 applies the control-target information 2100 and the operation quantity 2300 to the prediction-equation set 2500 to calculate the predicted value 2400.

However, the predicted-value calculation unit 15000 may use the accumulated information 2600 in calculating the predicted value 2400 as needed. The predicted value 2400 is a value to which the control target 21000 is expected to transition when the operation quantity 2300 is applied to the control target 21000. That is, the predicted value 2400 is a value equivalent to a result for the operation quantity 2300.

The predicted-value calculation unit 15000 may, for example, output the calculated predicted value 2400 to the output device 23000. As has been described already, the operation-quantity determination unit 14000 may output the operation quantity 2300 to the output device 23000. In this case, an operator is able to confirm both the operation quantity 2300 and the predicted value 2400 by referring to the output device 23000.

An advantageous effect of the exemplary embodiment will be described.

The information processing device 10020 of the exemplary embodiment is capable of obtaining the predicted value 2400 for the operation quantity 2300 in addition to the advantageous effects of the second exemplary embodiment.

That is because the predicted-value calculation unit 15000 calculates and outputs the predicted value 2400, on the basis of the prediction-equation set 2500, the control-target information 2100, and the operation quantity 2300.

The information processing device 10020 of the exemplary embodiment may cope with a plurality of the control targets 21000, as with the first exemplary embodiment. In this case, the predicted-value calculation unit 15000 calculates a plurality of the predicted values 2400. However, the predicted-value calculation unit 15000 may calculate a portion of the predicted values 2400 instead of all of the predicted values 2400. Alternatively, the predicted-value calculation unit 15000 may, for example, calculate the predicted value 2400 related with the control variable specified via the input device 22000.

The information processing device 10020 of the exemplary embodiment may be achieved by the computer illustrated in FIG. 5 as with the first exemplary embodiment.

Fourth Exemplary Embodiment

Figure 8:
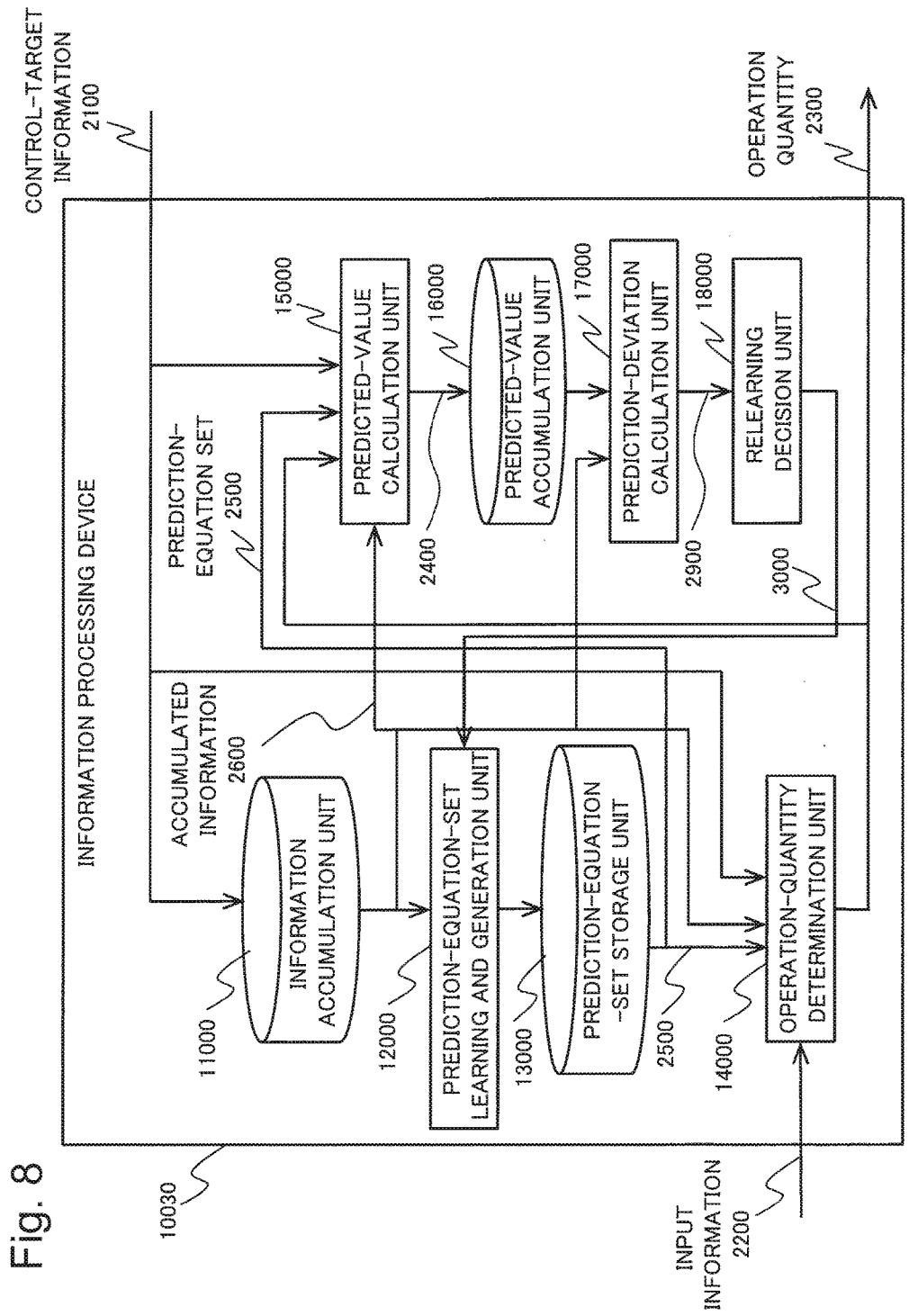
FIG. 8 is a block diagram illustrating an example of a configuration of an information processing device according to a fourth exemplary embodiment.

FIG. 8 is a block diagram illustrating an example of a configuration of an information processing device 10030 according to a fourth exemplary embodiment.

The information processing device 10030 of the exemplary embodiment includes a predicted-value accumulation unit 16000, a prediction-deviation calculation unit 17000, and a relearning decision unit 18000 in addition to the configurations of the information processing device 10020 of the third exemplary embodiment. The configurations of the rest of the information processing device 10030 are similar as the information processing device 10020. Thus, in the exemplary embodiment, configurations and operations differing from the third exemplary embodiment will be described, and descriptions of the same configurations and operations as the third exemplary embodiment will be omitted. The information processing device 10030 does not have to include the prediction-equation-set storage unit 13000 as with the information processing device 10000 of the first exemplary embodiment.

The predicted-value accumulation unit 16000 receives the predicted value 2400 calculated by the predicted-value calculation unit 15000 and accumulates the received predicted value 2400. Hereinafter, including the predicted values 2400 that the predicted-value accumulation unit 16000 has input, output, and accumulated, the predicted value will be referred to as the predicted value 2400.

The prediction-deviation calculation unit 17000 calculates a prediction deviation 2900 on the basis of the accumulated information 2600 accumulated in the information accumulation unit 11000 and the predicted value 2400 accumulated in the predicted-value accumulation unit 16000. The prediction deviation 2900 is a difference (deviation) between a value set to the control target 21000 (the control-target information 2100) and the predicted value 2400.

The relearning decision unit 18000 decides whether or not the prediction-equation-set learning and generation unit 12000 performs relearning on the basis of the prediction deviation 2900 calculated by the prediction-deviation calculation unit 17000. Hereinafter, a result of the decision will be referred to as "decision result 3000". The relearning decision unit 18000 may refer to other information, such as a threshold value, in the decision processing.

The prediction-equation-set learning and generation unit 12000 receives the decision result 3000 of the relearning decision unit 18000. When the decision result 3000 indicates performing relearning, the prediction-equation-set learning and generation unit 12000 relearns and regenerates a prediction-equation set 2500.

The relearning decision unit 18000 of the exemplary embodiment, for example, outputs a decision result 3000 that indicates performing relearning when the prediction deviation 2900 has increased to a value larger than or equal to a constant value (a threshold value). As a result, the prediction-equation-set learning and generation unit 12000 regenerates a prediction-equation set 2500. In such a way, the information processing device 10030 automatically relearns the prediction-equation set 2500. As a result, the information processing device 10030 is capable of maintaining high prediction accuracy.

The information processing device 10030 may perform relearning on the basis of an instruction from the input device 22000 or a not-illustrated external device. For example, when the surrounding environment 20000 has changed substantially and/or the configurations of the control target 21000 has been changed substantially, an operator may operate the input device 22000 to instruct the information processing device 10030 to perform relearning and regeneration of the prediction-equation set 2500. On the basis of the instruction, the information processing device 10030 may reactivate the prediction-equation-set learning and generation unit 12000 and update the prediction-equation set 2500. As a result, the information processing device 10030 is able to achieve control that is adapted to changes in the surrounding environment 20000 and/or the control target 21000.

An advantages effect of the exemplary embodiment will be described.

The information processing device 10030 of the exemplary embodiment is able to provide an advantageous effect of achieving higher prediction accuracy in addition to the advantageous effects of the third exemplary embodiment.

The reason for the advantageous effect is as follows.

The prediction-deviation calculation unit 17000 of the exemplary embodiment calculates the prediction deviation 2900 on the basis of the accumulated information 2600 and the predicted value 2400. When the prediction deviation 2900 is larger than the predetermined threshold value, the relearning decision unit 18000 instructs the prediction-equation-set learning and generation unit 12000 to relearn and regenerate the prediction-equation set 2500. As a result, the information processing device 10030 is able to generate a proper prediction-equation set 2500.

The information processing device 10030 of the exemplary embodiment may cope with a plurality of the control targets 21000 as with the first exemplary embodiment.

The information processing device 10030 of the exemplary embodiment may be achieved by the computer illustrated in FIG. 5 as with the first exemplary embodiment.

Fifth Exemplary Embodiment

Next, a more detailed exemplary embodiment of the operation-quantity determination unit 14000 will be described as a fifth exemplary embodiment with reference to the accompanying drawings.

Figure 9:
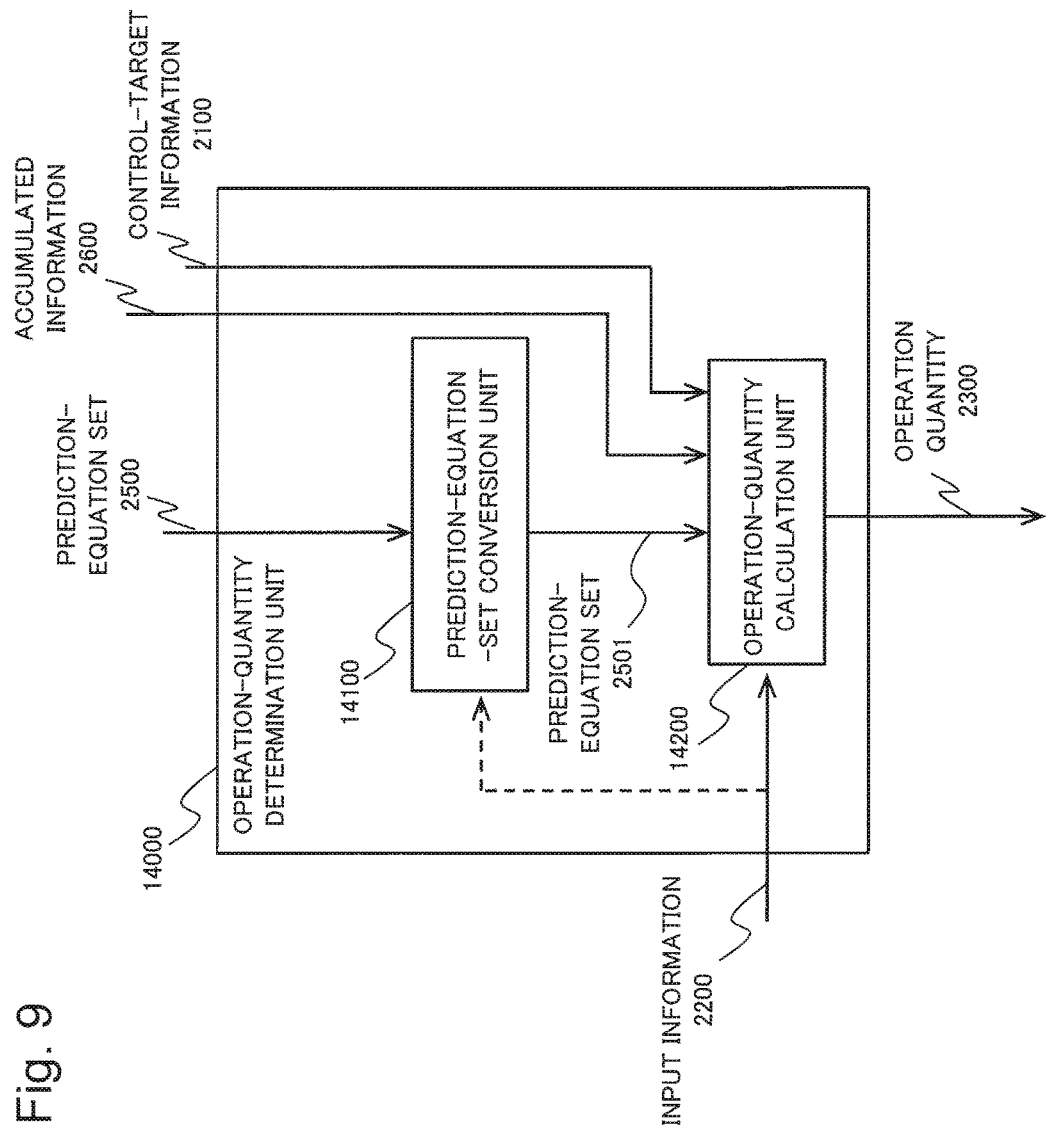
FIG. 9 is a block diagram illustrating an example of a configuration of an operation-quantity determination unit according to a fifth exemplary embodiment.

FIG. 9 is a block diagram illustrating an example of a configuration of an operation-quantity determination unit 14000 according to the exemplary embodiment.

The operation-quantity determination unit 14000 includes a prediction-equation-set conversion unit 14100 and an operation-quantity calculation unit 14200.

The prediction-equation-set conversion unit 14100 receives the prediction-equation set 2500. The prediction-equation-set conversion unit 14100 converts the prediction-equation set 2500 to a prediction-equation set 2501 in accordance with a predetermined rule so that calculation of the operation quantity 2300 by the operation-quantity calculation unit 14200, which will be described later, becomes easy. For example, the prediction-equation-set conversion unit 14100 may use conversion processing to simplify the prediction-equation set 2500. That is, the prediction-equation-set conversion unit 14100 may convert the prediction-equation set 2500 to a simplified prediction-equation set 2501 by deleting a variable related to the operation quantity 2300 with respect to the change of which a change of the predicted value 2400 is small. Specifically, the prediction-equation-set conversion unit 14100 may, for example, delete a variable whose coefficient is small in the prediction equation.

Alternatively, the prediction-equation-set conversion unit 14100 may convert the prediction-equation set 2500 to a prediction-equation set 2501 by using the priorities included in the input information 2200 input from the input device 22000. Specifically, for example, the prediction-equation-set conversion unit 14100 does not simplify a portion of the prediction-equation set 2500 that predicts a control variable with high priority, and may simplify a portion of the prediction-equation set 2500 that predicts a control variable with low priority. Alternatively, the prediction-equation-set conversion unit 14100 may simplify a control variable with low priority more and simplify a control variable with high priority less.

The operation-quantity calculation unit 14200 constructs the predictive-control model on the basis of the prediction-equation set 2501 converted by the prediction-equation-set conversion unit 14100, the control-target information 2100, the accumulated information 2600, and the input information 2200, and calculate the operation quantity 2300.

Figure 10:
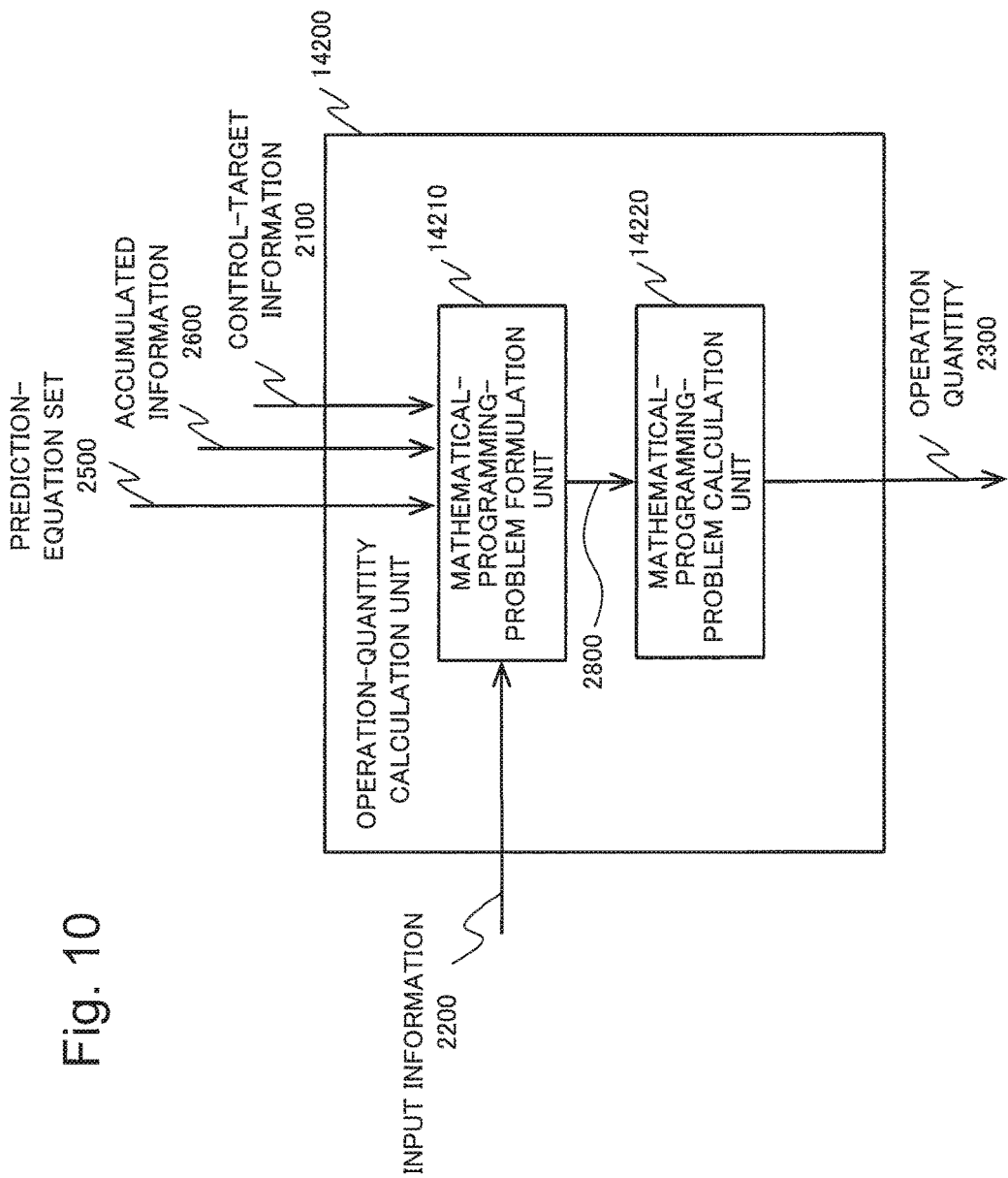
FIG. 10 is a block diagram illustrating an example of a configuration of an operation-quantity calculation unit according to the fifth exemplary embodiment.

FIG. 10 is a block diagram illustrating an example of a configuration of the operation-quantity calculation unit 14200 according to the exemplary embodiment.

The operation-quantity calculation unit 14200 includes a mathematical-programming-problem formulation unit 14210 and a mathematical-programming-problem calculation unit 14220.

The mathematical-programming-problem formulation unit 14210 constructs the predictive-control model and establishes (formulates) a mathematical programming problem 2800 on the basis of the prediction-equation set 2501 converted by the prediction-equation-set conversion unit 14100, the control-target information 2100, the accumulated information 2600, and the input information 2200. The mathematical programming problem 2800 is a problem that expresses (describes) the predictive-control model mathematically. The mathematical programming problem 2800, for example, is a linear programming problem, a quadratic programming problem, a combinatorial optimization problem, an integer linear problem, or a mixed integer programming problem.

Operations of the mathematical-programming-problem formulation unit 14210 will also be described later.

The mathematical-programming-problem calculation unit 14220 calculates (solves) the mathematical programming problem 2800 formulated by the mathematical-programming-problem formulation unit 14210 by using a proper solver to calculate the operation quantity 2300. The solver is a component that calculates an optimum solution for the formulated mathematical programming problem 2800. The solver may, for example, be not only a dedicated computer but also a program executed on a computer.

The configuration of the operation-quantity calculation unit 14200 does not have to be limited to the configuration illustrated in FIG. 10.

Figure 11:
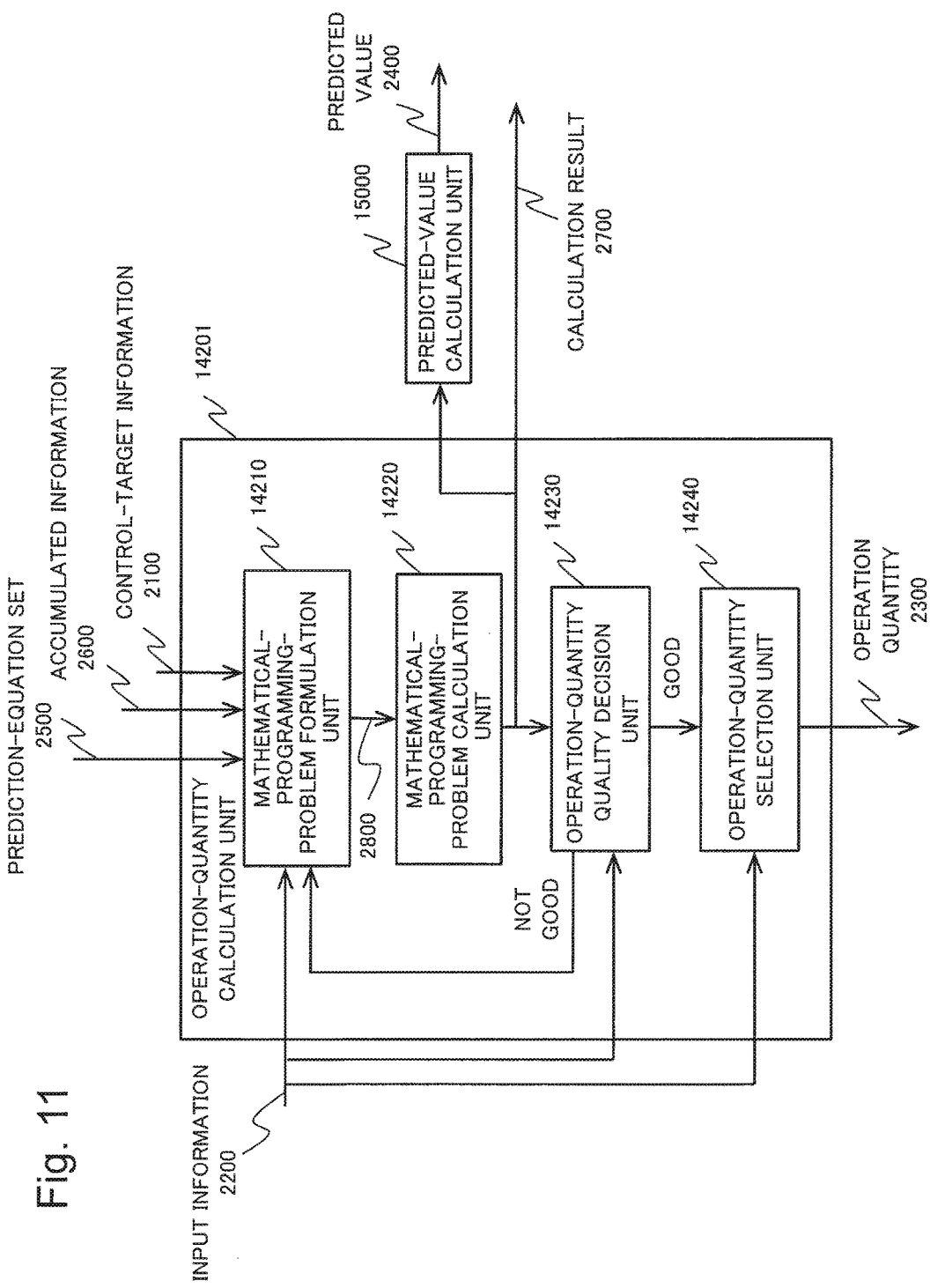
FIG. 11 is a block diagram illustrating an example of another configuration of the operation-quantity calculation unit according to the fifth exemplary embodiment.

FIG. 11 is a block diagram illustrating an example of another configuration of the operation-quantity calculation unit 14200.

An operation-quantity calculation unit 14201 illustrated in FIG. 11 includes the mathematical-programming-problem formulation unit 14210, the mathematical-programming-problem calculation unit 14220, an operation-quantity quality decision unit 14230, and an operation-quantity selection unit 14240.

Since the mathematical-programming-problem formulation unit 14210 and the mathematical-programming-problem calculation unit 14220 are the same as the mathematical-programming-problem formulation unit 14210 and the mathematical-programming-problem calculation unit 14220 illustrated in FIG. 10, detailed descriptions thereof will be omitted. However, the mathematical-programming-problem calculation unit 14220 may output a plurality of the calculation results 2700.

As illustrated in FIG. 11, the predicted-value calculation unit 15000 calculates the predicted value 2400 on the basis of the calculation result 2700 from the mathematical-programming-problem calculation unit 14220. When the mathematical-programming-problem calculation unit 14220 outputs a plurality of the calculation results 2700, the predicted-value calculation unit 15000 calculates the predicted value 2400 with respect to each of the calculation result 2700. The calculation result 2700 from the mathematical-programming-problem calculation unit 14220 and the predicted value 2400 calculated by the predicted-value calculation unit 15000 are, for example, output to the output device 23000.

The operation-quantity quality decision unit 14230 decides the quality of the calculation result 2700 (which becomes the operation quantity 2300) on the basis of the calculation result 2700 from the mathematical-programming-problem calculation unit 14220 and information of "quality decision" included in the input information 2200 from the input device 22000.

For example, the output device 23000 displays the calculation result 2700 and the predicted value 2400. An operator decides whether or not the calculation result 2700 (equivalent to the operation quantity 2300) and the predicted value 2400 are proper referring to the values displayed on the output device 23000. The operator, by using the input device 22000, transmits the "quality decision" to the operation-quantity calculation unit 14201.

Alternatively, the operation-quantity quality decision unit 14230 may have a reference value for the "quality decision" (for example, a threshold value or a range in which a value is decided to be proper) in advance and decide the quality on the basis of the reference value.

When the "quality decision" results in a negative result, the operation-quantity quality decision unit 14230 instructs the mathematical-programming-problem formulation unit 14210 to reformulate a mathematical programming problem again. In the reformulation, it is preferable that the mathematical-programming-problem formulation unit 14210 receives new input information 2200 (for example, a setting value, a constraint, or a priority) so as to be able to calculate a proper operation quantity 2300. For that purpose, the operation-quantity calculation unit 14201 may make a request for re-input to the operator through the output device 23000.

When the "quality decision" results in a positive result, the operation-quantity quality decision unit 14230 transmits the calculation result 2700 to the operation-quantity selection unit 14240.

The operation-quantity selection unit 14240 selects the proper operation quantity 2300. When the number of calculation results 2700 from the mathematical-programming-problem calculation unit 14220 is one, the operation-quantity selection unit 14240 selects the calculation result 2700 as the operation quantity 2300.

When the number of calculation results 2700 from the mathematical-programming-problem calculation unit 14220 is more than one, the operation-quantity selection unit 14240 selects a calculation result 2700 as the operation quantity 2300 on the basis of the input information 2200 from the input device 22000. Alternatively, the operation-quantity selection unit 14240 may select the proper calculation result 2700 as the operation quantity 2300 in accordance with a predetermined rule. The predetermined rule is, for example, a rule to select the calculation result 2700 that has a smallest difference with the last operation quantity 2300 or a rule to select the calculation result 2700 that has a smallest predicted cost.

Figure 12:
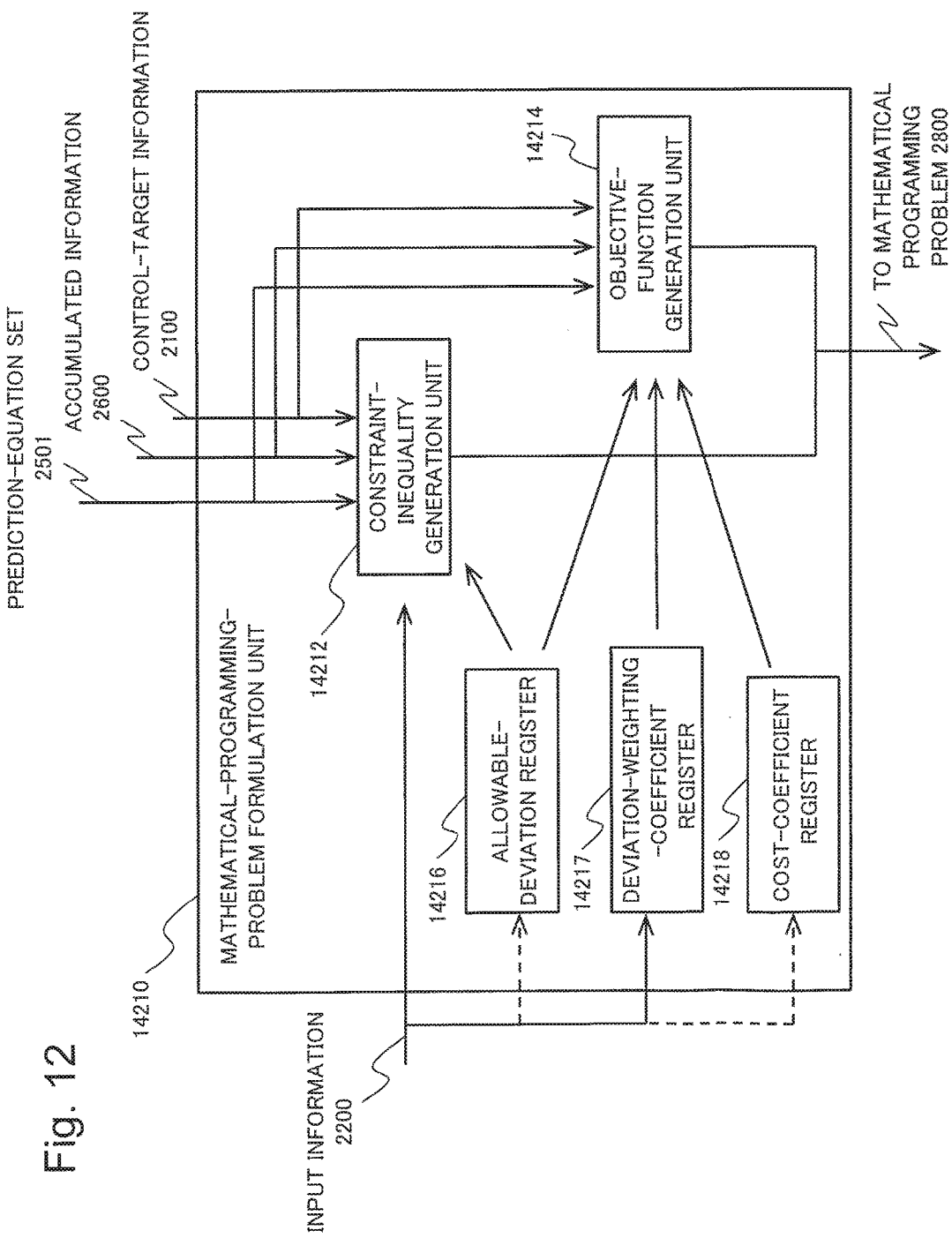
FIG. 12 is a block diagram illustrating an example of a configuration of a mathematical-programming-problem formulation unit according to the fifth exemplary embodiment.

FIG. 12 is a block diagram illustrating an example of a configuration of the mathematical-programming-problem formulation unit 14210 according to the exemplary embodiment.

The mathematical-programming-problem formulation unit 14210 illustrated in FIG. 12 includes a constraint-inequality generation unit 14212, an objective-function generation unit 14214, an allowable-deviation register 14216, a deviation-weighting-coefficient register 14217, and a cost-coefficient register 14218.

The constraint-inequality generation unit 14212 generates a constraint inequality on the basis of at least one of the prediction-equation set 2501 converted by the prediction-equation-set conversion unit 14100, the control-target information 2100, the accumulated information 2600, the input information 2200, and allowable deviations which will be described later. However, the input information 2200 includes at least either a setting value or a constraint.

The allowable-deviation register 14216 holds an allowable deviation which is a maximum difference allowed for a difference between a setting value and the predicted value 2400. For example, when a predicted value 2400 is allowed to be in a range from 8 to 12 with respect to a setting value of 10, the allowable deviation becomes "±2".

The deviation-weighting-coefficient register 14217 holds deviation weighting coefficients that are coefficients to treat priorities defined for a plurality of the control targets 21000 as deviation weights. For example, it is assumed that two control targets A and B exist. It is also assumed that control of the control target A has a higher priority than control of the control target B. In this case, the deviation-weighting-coefficient register 14217 holds, as a deviation weighting coefficient for the control target A, a larger deviation weighting coefficient than a deviation weighting coefficient for the control target B. On the basis of such an operation, the mathematical-programming-problem formulation unit 14210 enables formulation in which priorities are taken into consideration. For example, the larger a difference between deviation weighting coefficients is, the larger difference the mathematical-programming-problem formulation unit 14210 is capable of providing priorities with.

When priorities are not specified, the mathematical-programming-problem formulation unit 14210 does not have to receive priorities from the input device 22000. In this case, the deviation-weighting-coefficient register 14217 may hold the same value other than 0 for all deviation weighting coefficients. Alternatively, in this case, the mathematical-programming-problem formulation unit 14210 does not have to use the deviation-weighting-coefficient register 14217.

The cost-coefficient register 14218 holds cost coefficients that are coefficients to treat a plurality of cost indexes in a uniform manner. For example, an amount of money is generally a value that can be treated in a uniform manner. Thus, when an amount of electricity usage and an amount of gas usage are expected to be counted as costs, the cost-coefficient register 14218 converts respective amounts of usage into amounts of money by multiplying the amounts of usage by respective unit costs and holds the converted values. Then, the mathematical-programming-problem formulation unit 14210 becomes able to treat cost indexes for the amount of electricity usage and the amount of gas usage in a uniform manner.

The objective-function generation unit 14214 generates an objective function on the basis of the prediction-equation set 2501 converted by the prediction-equation-set conversion unit 14100, the control-target information 2100, the accumulated information 2600, the allowable deviation, the deviation weighting coefficients, and the cost coefficients.

The mathematical-programming-problem formulation unit 14210 may receive the allowable deviations and the cost coefficients from the input device 22000.

Advantageous effects of the exemplary embodiment will be described.

The first advantageous effect is that it is possible to reduce the amount of calculation.

That is because the prediction-equation-set conversion unit 14100 simplifies the prediction-equation set 2500 used for calculation.

The second advantageous effect is that it becomes possible to perform more accurate prediction.

That is because the operation-quantity quality decision unit 14230 is capable of instructing the mathematical-programming-problem formulation unit 14210 to perform reformulation on the basis of "quality decision".

Sixth Exemplary Embodiment

Figure 14:
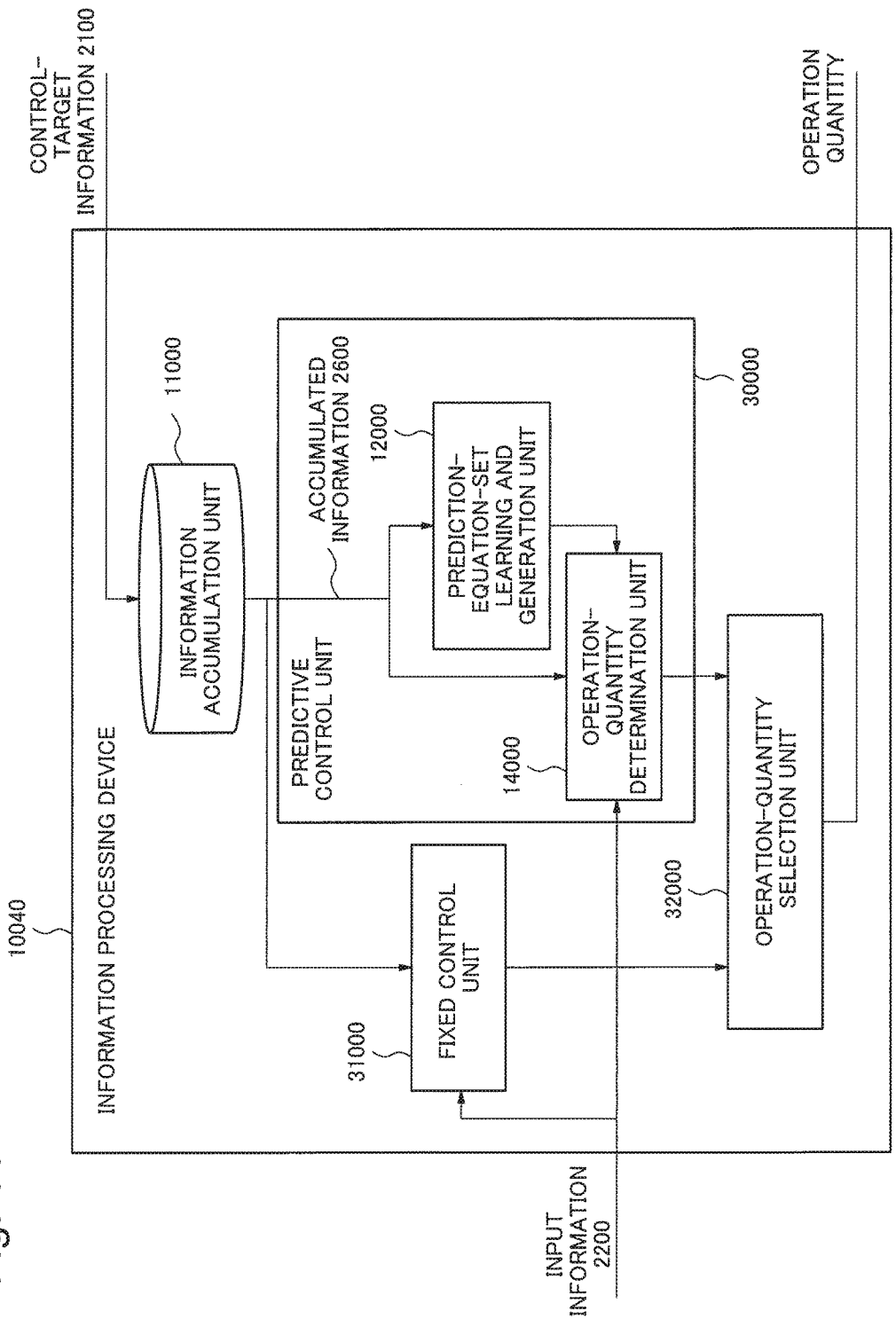
FIG. 14 is a block diagram illustrating an example of a configuration of an information processing device according to a sixth exemplary embodiment.

FIG. 14 is a block diagram illustrating an example of a configuration of an information processing device 10040 according to a sixth exemplary embodiment.

The information processing device 10040 of the exemplary embodiment includes an information accumulation unit 11000, a predictive control unit 30000, a fixed control unit 31000, and an operation-quantity selection unit 32000.

The information accumulation unit 11000 is the same as the information accumulation units in the first to fifth exemplary embodiments. The predictive control unit 30000 includes a prediction-equation-set learning and generation unit 12000 and an operation-quantity determination unit 14000 that are the same as the prediction-equation-set learning and generation units 12000 and the operation-quantity determination units 14000 in the first to fifth exemplary embodiments, and achieves the same operations as the operations in the first to fifth exemplary embodiments. The fixed control unit 31000 calculates an operation quantity in accordance with a preset control equation. The operation-quantity selection unit 32000 selects a control quantity out of a plurality of control quantity and outputs the selected control quantity.

The information accumulation unit 11000 and the predictive control unit 30000 perform operations described in the first to fifth exemplary embodiments to output an operation quantity based on predictive control. The operation quantity is a first operation quantity.

In the exemplary embodiment, the control-target information 2100, instead of being input to the operation-quantity determination unit 14000 directly, is used as the accumulated information 2600 by way of the information accumulation unit 11000. However, this configuration is an example of information flow. As in the first to fifth exemplary embodiments, the control-target information 2100 may be input directly. Alternatively, conversely, the control-target information 2100 may be input by way of the information accumulation unit 11000 in the first to fifth exemplary embodiments.

The fixed control unit 31000 calculates an operation quantity on the basis of the control-target information 2100 and the accumulated information 2600 by using a control equation that has been input by a designer, and outputs the calculated operation quantity. The operation quantity is a second operation quantity.

In the fixed control unit 31000, the control equation is configured with a relational equation between input (information on a surrounding environment and a measurement target), a setting value, and output (an operation quantity). At this time, the fixed control unit 31000 may use, as a relational equation, a control method equation, such as feedback control and feedforward control that are obtained by applying a classical control theory, such as proportional control and PID (Proportional Integral Derivative) control, or a modern control theory based on a state equation.

Figure 15:
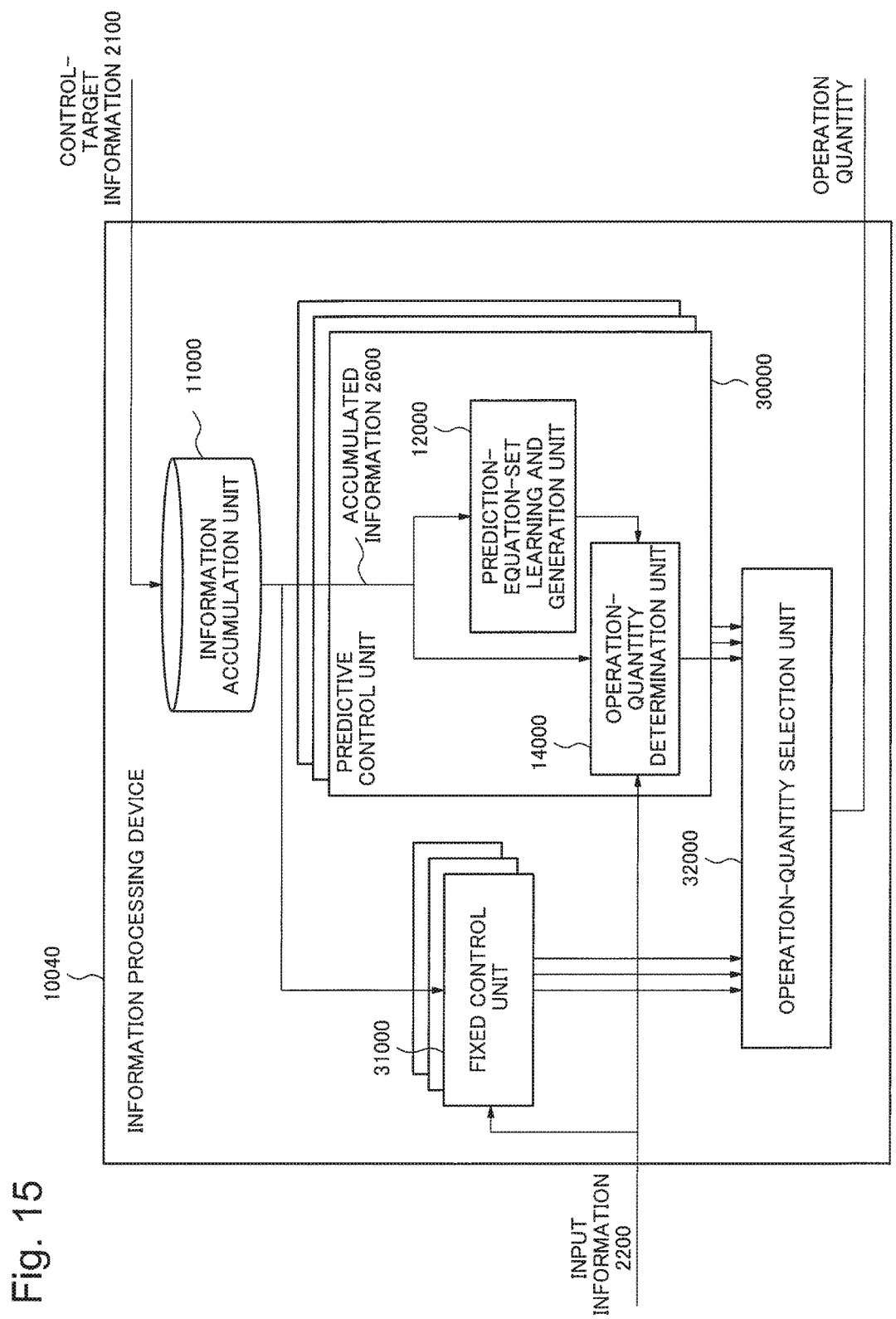
FIG. 15 is a block diagram illustrating a second example of the configuration of the information processing device according to the sixth exemplary embodiment.

As illustrated in FIG. 15, each of the number of predictive control units 30000 and the number of fixed control units 31000 is not limited to one. A plurality of predictive control units 30000 and/or a plurality of fixed control units 31000 may be included. There is a case in which the predictive control unit 30000 has a different characteristic due to randomness in an initial value or the like. Therefore, by preparing a plurality of the predictive control units 30000, the information processing device 10040 is able to output operation quantity with different characteristics. When the designer has prepared control equations differing from each other in term of tracking capability, stability, or the like, a plurality of the fixed control units 31000 may also be included.

The operation-quantity selection unit 32000 selects whether the operation-quantity determination unit 14000 or the fixed control unit 31000 is used.

Figure 16:
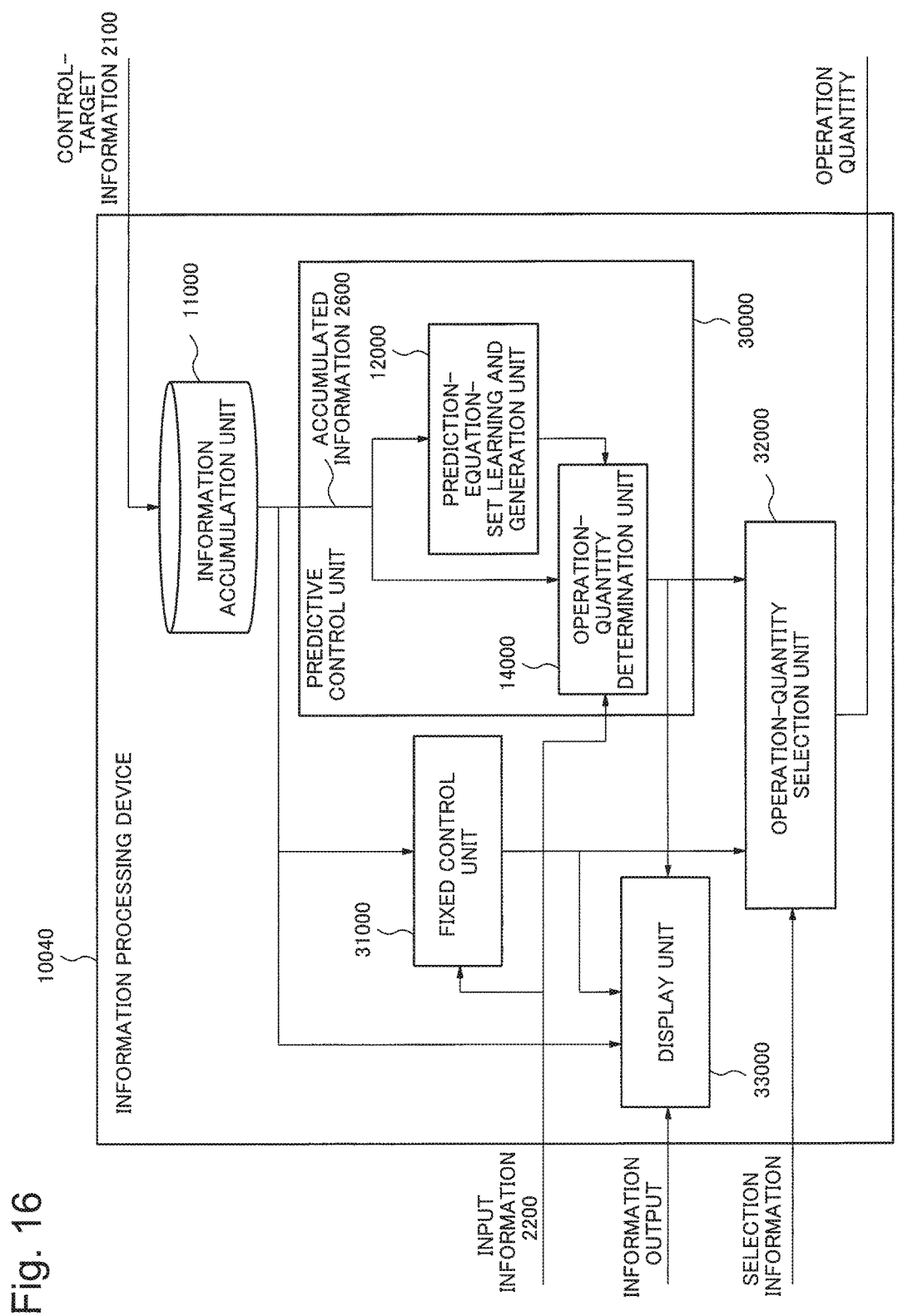
FIG. 16 is a block diagram illustrating a third example of the configuration of the information processing device according to the sixth exemplary embodiment.

At this case, the information processing device 10040 may, for example as illustrated in FIG. 16, include a display unit 33000 that displays, to users, any one of the control-target information 2100, the accumulated information 2600, an operation quantity output by the operation-quantity determination unit 14000, or the operation quantity output by the fixed control unit. The operation-quantity selection unit 32000, on the basis of input (selection information) from the users, selects any one of an operation quantity from the predictive control unit 30000 or the fixed control unit 31000, and outputs the selected operation quantity.

Figure 17:
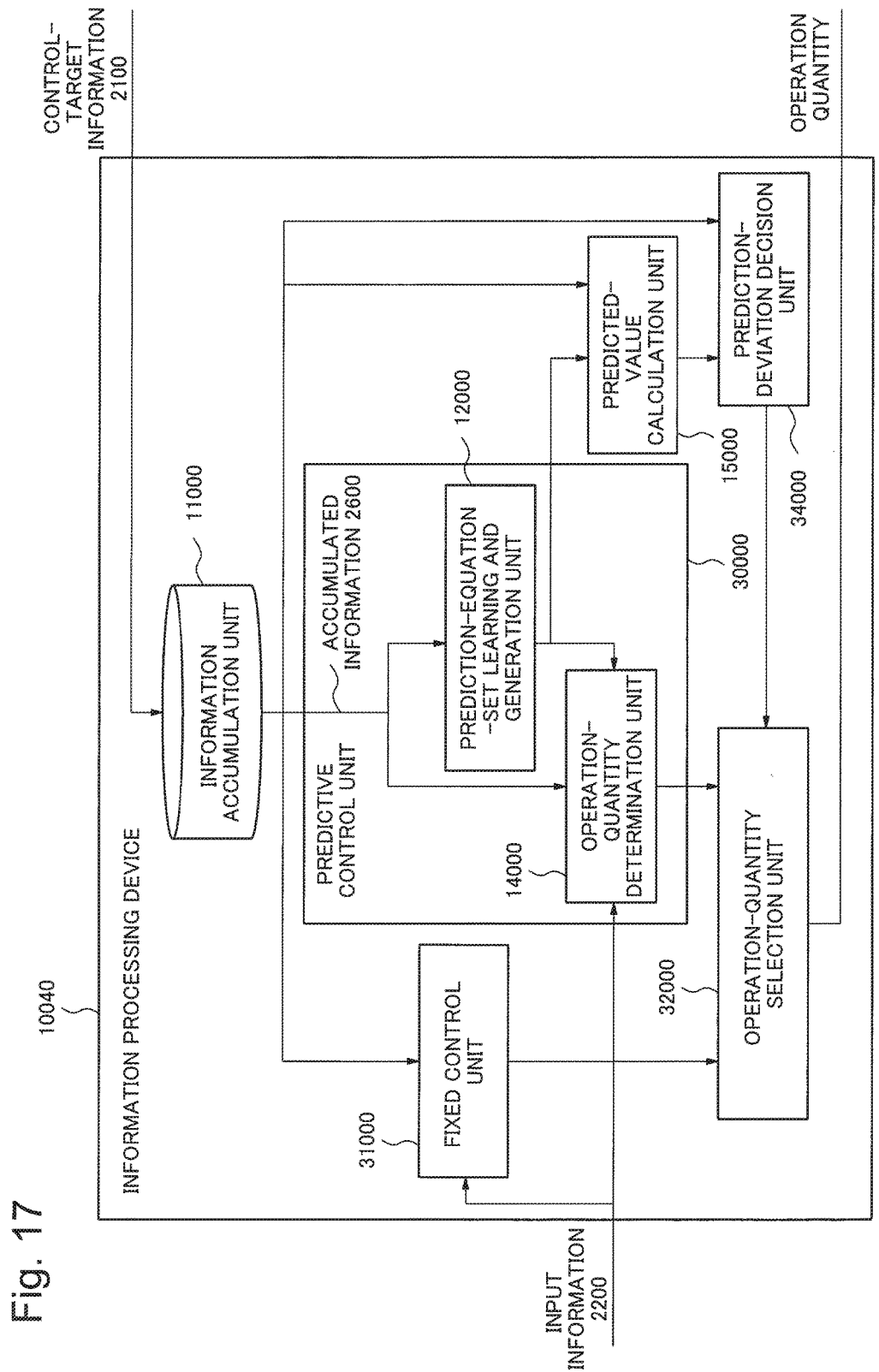
FIG. 17 is a block diagram illustrating a fourth example of the configuration of the information processing device according to the sixth exemplary embodiment.

As another example, as illustrated in FIG. 17, the information processing device 10040 may include a prediction-deviation decision unit 34000 that uses the predicted-value calculation unit 15000 described in the third exemplary embodiment. The prediction-deviation decision unit 34000 calculates a predicted value by using the predicted-value calculation unit 15000 and compares the calculated predicted value with information in the accumulated information 2600 to obtain a deviation for the prediction. On the basis of the values of the deviations, the operation-quantity selection unit 32000 determines whether the operation quantities from the predictive control units 30000 or the operation quantity from the fixed control unit 31000 is used. The prediction-deviation decision unit 34000, for example, selects the predictive control unit 30000 that achieves the least deviation out of the predictive control units 30000. When the deviation from the selected predictive control unit 30000 is equal to or less than a constant value, the operation-quantity selection unit 32000 selects an operation quantity from the predictive control unit 30000 achieving the least deviation. When the deviations from the predictive control units 30000 are larger than the constant value, the operation-quantity selection unit 32000 selects the fixed control unit 31000. In such a way, the operation-quantity selection unit 32000 outputs the selection result. On the basis of such an operation, when prediction accuracy is sufficiently high, that is, the predictive control unit 30000 has high accuracy, the predictive control unit 30000 is selected. In consequence, the information processing device 10040 is capable of performing control with high accuracy.

Figure 18:
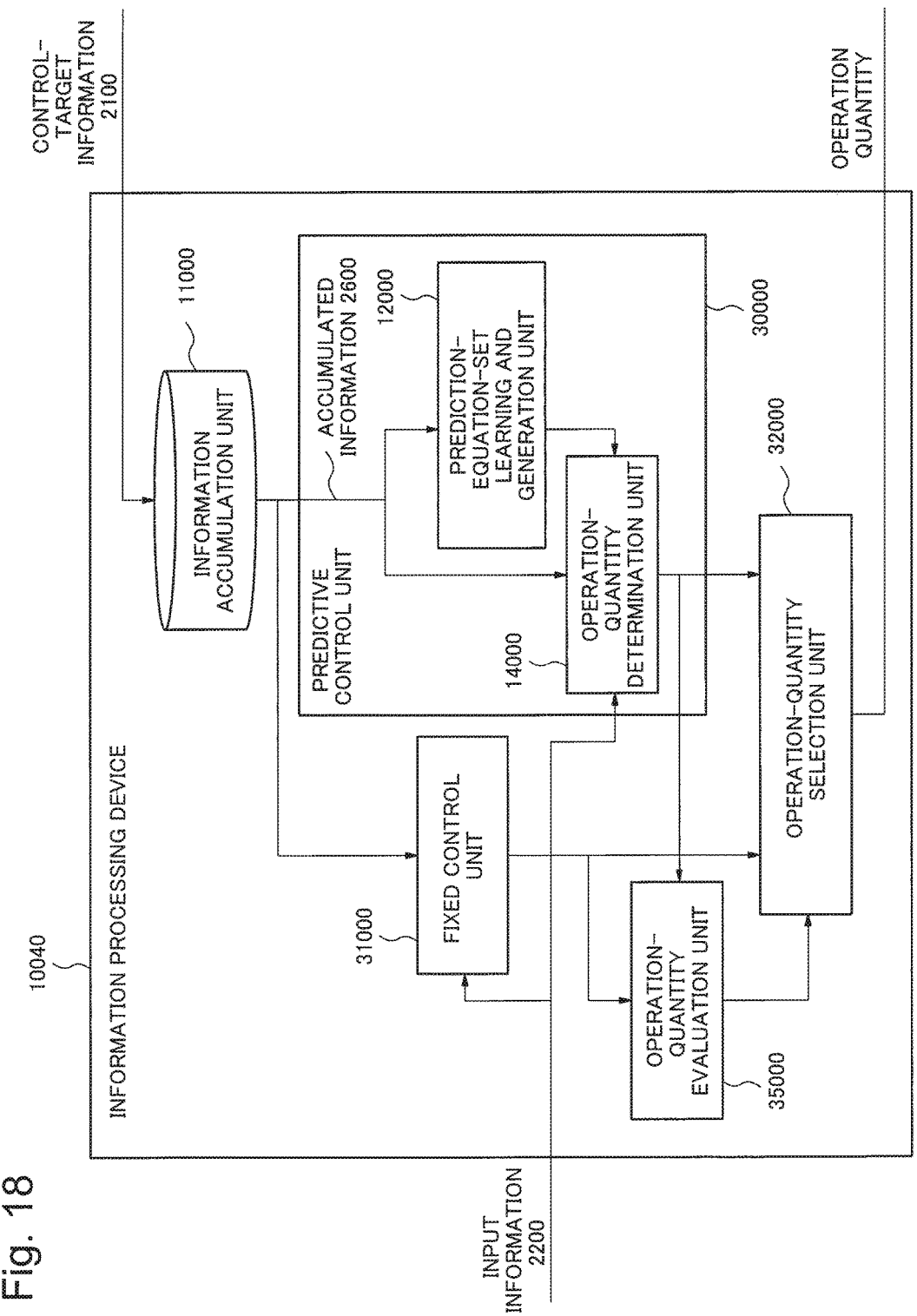
FIG. 18 is a block diagram illustrating a fifth example of the configuration of the information processing device according to the sixth exemplary embodiment.

As further another example, as illustrated in FIG. 18, the information processing device 10040 may include an operation-quantity evaluation unit 35000 which evaluates an operation quantity based on an operation quantity from the operation-quantity determination unit 14000 or the fixed control unit 31000, and selects an operation quantity to be used. The operation-quantity selection unit 32000 of the information processing device 10040 may select an operation quantity on the basis of the selection result of the operation-quantity evaluation unit 35000. The operation-quantity evaluation unit 35000 inputs an operation quantity into an evaluation function that has been input to the operation-quantity evaluation unit 35000 in advance. Then, the operation-quantity evaluation unit 35000 outputs the operation quantity evaluated to be a best result as the selection result. The evaluation function may, for example, be a function to calculate a cost required for performing an operation quantity. In this case, the information processing device 10040 is capable of selecting control with the lowest cost and controlling the control target at a low cost.

Figure 19:
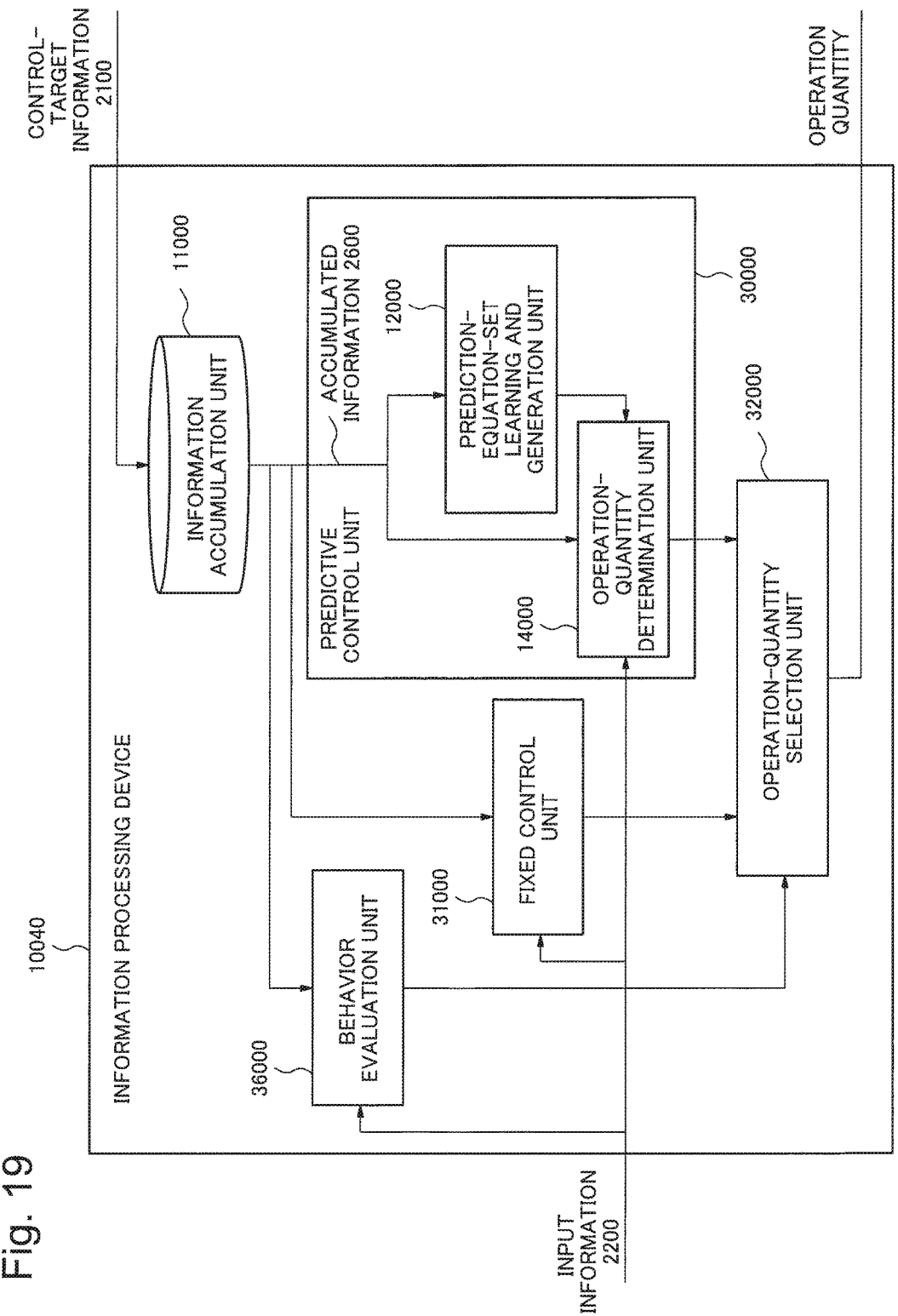
FIG. 19 is a block diagram illustrating a sixth example of the configuration of the information processing device according to the sixth exemplary embodiment.

As further another example, as illustrated in FIG. 19, the information processing device 10040 may include a behavior evaluation unit 36000 which evaluates behavior of the control target on the basis of the information in the accumulated information 2600 and the input information 2200 and outputs a selection result. In this case, the operation-quantity selection unit 32000 of the information processing device 10040 selects the operation quantity on the basis of the selection result of the behavior evaluation unit 36000. The behavior evaluation unit 36000 compares a setting value for the control target 21000 in the input information with the accumulated information 2600. The behavior evaluation unit 36000 evaluates whether or not the control target is behaving within a set range of deviation along the setting value. When the control target is behaving along the setting value, the operation-quantity selection unit 32000 selects the operation quantity from the predictive control unit 30000. When the control target is not behaving along the setting value, the operation-quantity selection unit 32000 selects the fixed control unit 31000. On the basis of such an operation, when the control characteristic of the predictive control unit 30000 is not sufficient, the information processing device 10040 is capable of performing control by using the fixed control unit 31000 to increase stability.

Figure 20:
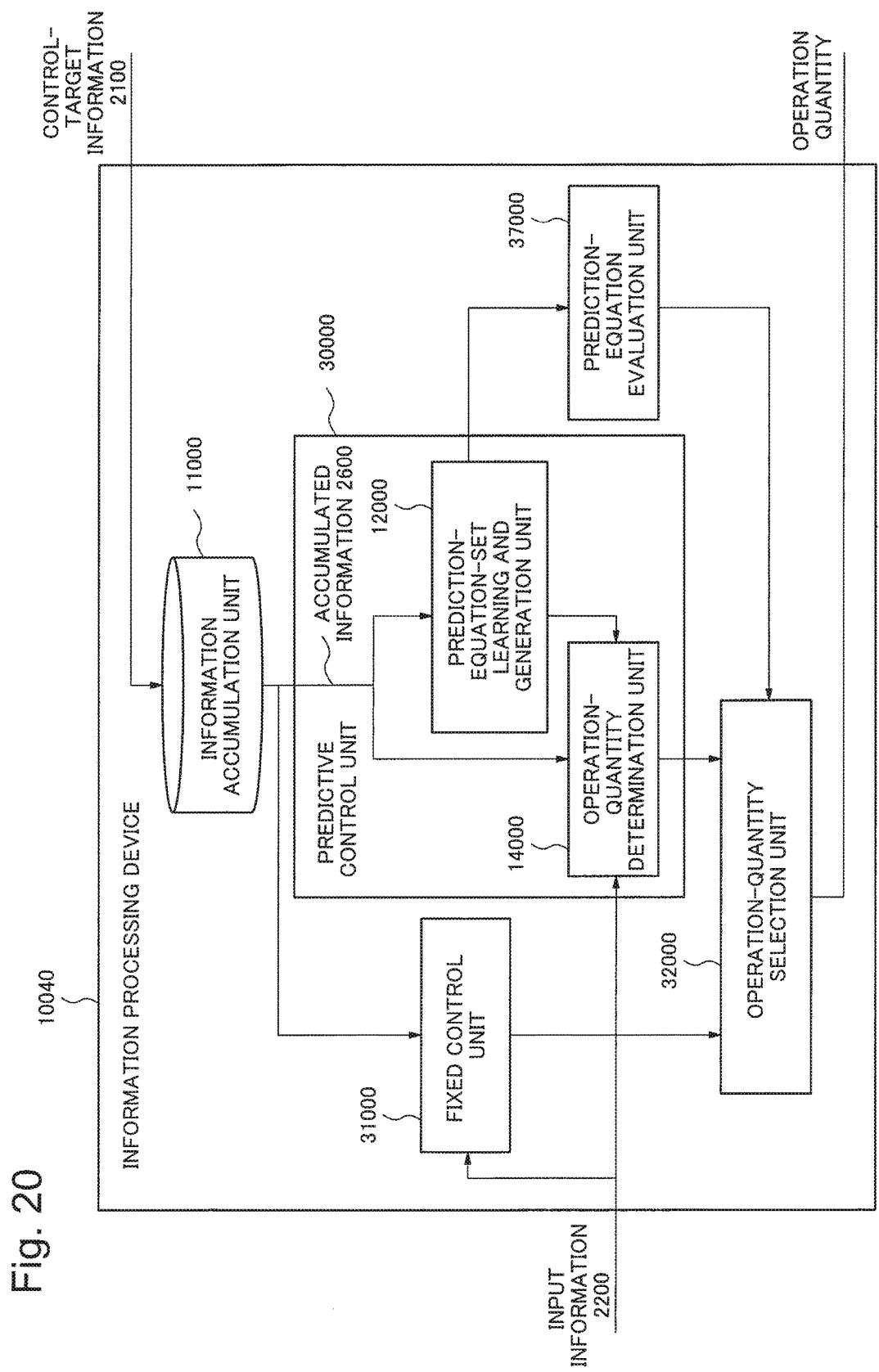
FIG. 20 is a block diagram illustrating a seventh example of the configuration of the information processing device according to the sixth exemplary embodiment.

As further another example, as illustrated in FIG. 20, the information processing device 10040 may include the prediction-equation-set learning and generation unit 12000 and select a result among selection results of a prediction-equation evaluation unit 37000 that evaluates a prediction equation on the basis of an evaluation value of learning performed by the prediction-equation-set learning and generation unit 12000. The prediction-equation evaluation unit 37000 operates as follows. In performing learning, the prediction-equation-set learning and generation unit 12000 has an evaluation value for the learning internally. An example of the evaluation value is an evaluation value of an information criterion. When the evaluation value results in a better value than a preset value, the operation-quantity selection unit 32000 decides that the prediction equation is sufficient and selects use of the predictive control unit 30000. In cases other than the above-described case, the operation-quantity selection unit 32000 selects the fixed control unit 31000.

An advantageous effect of the exemplary embodiment will be described.

The exemplary embodiment is capable of providing an advantageous effect of achieving control with a higher accuracy in addition to the advantageous effects of the first to fifth exemplary embodiments.

That is because the operation-quantity selection unit 32000 of the information processing device 10040 properly selects either the first operation quantity, which is output from the predictive control unit 30000, or the second operation quantity, which is output from the fixed control unit 31000.

[Form of Prediction Equation Set and Formulation of Mathematical Programming Problem]

Next, an example of the operation to generate the prediction-equation set 2500 that is learned and generated by the prediction-equation-set learning and generation unit 12000 and an example of the operation of the operation-quantity determination unit 14000, in the first to fifth exemplary embodiments, will be described. Regarding the example of the operation of the operation-quantity determination unit 140000, the example of formulation in the mathematical-programming-problem formulation unit 14210 in the fifth exemplary embodiment illustrated in FIGS. 9 to 12 will be described by using mathematical equations.

First, as a presupposition for description, it is assumed that the prediction-equation set 2500 that is learned and generated by the prediction-equation-set learning and generation unit 12000 is a set of discrete time linear functions.

The number of control variables of the control target 21000 is assumed to be "$n_y$", and the control variables are denoted by "$y_1, y_2, \ldots$".

The number of variables indicating a state of a surrounding environment 20000 and the control target 21000 (hereinafter, referred to as "state variable") is assumed to be "$n_x$", and the state variables are denoted by "$x_1, x_2, \ldots$". For example, one example of the state variable is a variable of weather forecast. Forecasted weather that is obtained at a present time in the weather forecast is interpreted as a present state variable and is not interpreted as a future state variable. The state variable is equivalent to the control-target information 2100.

In particular, the number of variables that have influence on the cost of the control target 21000 (hereinafter, referred to as "cost variable") among the state variables is assumed to be "$n_c$", and the cost variables are denoted by "$c_1, c_2, \ldots$".

The number of variables that indicate operation quantities applied to the control target 21000 (hereinafter, referred to as "operation variable") is assumed to be "$n_u$", and the operation variables are denoted by "$u_1, u_2, \ldots$".

Then, in the prediction-equation-set learning and generation unit 12000, a prediction equation that uses a control variable "$y_1$" of i steps ahead in the future at the k-th step as a dependent variable is expressed by an equation 1 below. That is, the equation 1 has the following form. That is, first, the equation 1 multiplies state variables from n steps back to the k-th step, that is, from a point of time in the past to a present time, by coefficients corresponding to the respective state variables. Next, the equation 1 multiplies operation variables from n steps back to the step before the k-th step, that is, from the point of time in the past to the point of time immediately before the present time, by coefficients corresponding to the respective operation variables. Next, the equation 1 multiplies operation variables from the k-th step to the step before one step of i steps ahead at the k-th step, that is, from the present time to a point of time in the future, by coefficients corresponding to the respective operation variables. Then, the equation 1 completes a form by adding a constant to the above result.

"$a_y$" is a predefined coefficients corresponding to the control variable "$y_1$".

$$y_1(k+1) = a_{y_1,i,x_1,0} \times x_1(k) + a_{y_1,i,x_1,-1} \times x_1(k-1) + \ldots + $$
$$a_{y_1,i,x_1,-n} \times x_1(k-n) + \ldots + a_{y_1,i,x_{n_x},0} \times x_{n_x}(k) + $$
$$a_{y_1,i,x_{n_x},-1} \times x_{n_x}(k-1) + \ldots + a_{y_1,i,x_{n_x},-n} \times x_{n_x}(k-n) + $$
$$a_{y_1,i,u_1,-1} \times u_1(k-1) + \ldots + a_{y_1,i,u_1,-n} \times u_1(k-n) + $$
$$a_{y_1,i,u_1,0} \times u_1(k) + a_{y_1,i,u_1,1} \times u_1(k+1) + \ldots + $$
$$a_{y_1,i,u_1,i-1} \times u_1(k+i-1) + \ldots + $$
$$a_{y_1,i,u_{n_u},-1} \times u_{n_u}(k-1) + \ldots + a_{y_1,i,u_{n_u},-n} \times u_{n_u}(k-n) + $$
$$a_{y_1,i,u_{n_u},0} \times u_{n_u}(k) + a_{y_1,i,u_{n_u},1} \times u_{n_u}(k+1) + \ldots + $$
$$a_{y_1,i,u_{n_u},i-1} \times u_{n_u}(k+i-1) + b_{y_1,i}$$

[Equation 1]

The equation 1 can be rewritten as an equation 2 using matrices.

$$y_1(k+1) = \begin{bmatrix} a_{y_1,i,x_1,-n} & \cdots \end{bmatrix}$$
$$a_{y_1,i,x_1,0} \cdots a_{y_1,i,x_{n_x},-n} \cdots a_{y_1,i,x_{n_x},0}] \times $$
$$[x_1(k-n) \cdots x_1(k) \cdots x_{n_x}(k-n) \cdots x_{n_x}(k)]^T + $$
$$[a_{y_1,i,u_1,-n} \cdots a_{y_1,i,u_1,i-1} \cdots a_{y_1,i,u_{n_u},-n} \cdots $$
$$a_{y_1,i,u_{n_u},i-1}] \times [u_1(k-n) \cdots u_1(k+i-1) $$
$$\cdots u_{n_u}(k-n) \cdots u_{n_u}(k+i-1)]^T + b_{y_1,i}$$

[Equation 2]

T denotes a transposed matrix.

Similarly, prediction equations of control variables "$y_2, \ldots$" of i steps ahead in the future at the k-th step can be described. The prediction-equation-set learning and generation unit 12000 is able to generate the prediction-equation set 2500 that use the control variables "$y_1, y_2, \ldots$" as dependent variables by an equation 3 below using matrices.

$$\begin{bmatrix} y_1(k+i) \\ \vdots \\ y_{n_y}(k+i) \end{bmatrix} = $$

$$\begin{bmatrix} a_{y_1,i,x_1,-n} & \cdots & a_{y_1,i,x_1,0} & \cdots & a_{y_1,i,x_{n_x},-n} & \cdots & a_{y_1,i,x_{n_x},0} \\ \vdots & \ddots & \vdots & \ddots & \vdots & \ddots & \vdots \\ a_{y_{n_y},i,x_1,-n} & \cdots & a_{y_{n_y},i,x_1,0} & \cdots & a_{y_{n_y},i,x_{n_x},-n} & \cdots & a_{y_{n_y},i,x_{n_x},0} \end{bmatrix} \times$$

$$\begin{bmatrix} x_1(k-n) \\ \vdots \\ x_1(k) \\ \vdots \\ x_{n_x}(k-n) \\ \vdots \\ x_{n_x}(k) \end{bmatrix} + $$

$$\begin{bmatrix} a_{y_1,i,u_1,-n} & \cdots & a_{y_1,i,u_1,i-1} & \cdots & a_{y_1,i,u_{n_u},-n} & \cdots & a_{y_1,i,u_{n_u},i-1} \\ \vdots & \ddots & \vdots & \ddots & \vdots & \ddots & \vdots \\ a_{y_{n_y},i,u_1,-n} & \cdots & a_{y_{n_y},i,u_1,i-1} & \cdots & a_{y_{n_y},i,u_{n_u},-n} & \cdots & a_{y_{n_y},i,u_{n_u},i-1} \end{bmatrix} \times$$

$$\begin{bmatrix} u_1(k-n) \\ \vdots \\ u_1(k+i-1) \\ \vdots \\ u_{n_u}(k-n) \\ \vdots \\ u_{n_u}(k+i-1) \end{bmatrix} + \begin{bmatrix} b_{y_1,i} \\ \vdots \\ b_{y_{n_y},i} \end{bmatrix}$$

[Equation 3]

The equation 3 can be simplified and expressed by an equation 4 below.

$$Y(k+i) = A_{x,y,i} \times X(k-n,k) + A_{u,y,i} \times U(k-n,k+i-1) + B_{y,i}$$  [Equation 4]

The respective matrices and vectors in the equation 4 are defined as follows.

$$Y(k+1) = \begin{bmatrix} y_1(k+i) \\ \vdots \\ y_{n_y}(k+i) \end{bmatrix}$$

$$A_{x,y,i} = \begin{bmatrix} a_{y_1,i,x_1,-n} & \cdots & a_{y_1,i,x_1,0} & \cdots & a_{y_1,i,x_{n_x},-n} & \cdots & a_{y_1,i,x_{n_x},0} \\ \vdots & \ddots & \vdots & \ddots & \vdots & \ddots & \vdots \\ a_{y_{n_y},i,x_1,-n} & \cdots & a_{y_{n_y},i,x_1,0} & \cdots & a_{y_{n_y},i,x_{n_x},-n} & \cdots & a_{y_{n_y},i,x_{n_x},0} \end{bmatrix}$$

$$X(k-n,k) = \begin{bmatrix} x_1(k-n) \\ \vdots \\ x_1(k) \\ \vdots \\ x_{n_x}(k-n) \\ \vdots \\ x_{n_x}(k) \end{bmatrix}$$

-continued $$A_{u,y,i} = \begin{bmatrix} a_{y_1,i,u_1,-n} & \cdots & a_{y_1,i,u_1,i-1} & \cdots & a_{y_1,i,u_{n_u},-n} & \cdots & a_{y_1,i,u_{n_u},i-1} \\ \vdots & \ddots & \vdots & \ddots & \vdots & \ddots & \vdots \\ a_{y_{n_y},i,u_1,-n} & \cdots & a_{y_{n_y},i,u_1,i-1} & \cdots & a_{y_{n_y},i,u_{n_u},-n} & \cdots & a_{y_{n_y},i,u_{n_u},i-1} \end{bmatrix}$$

$$U(k-n, k+i-1) = \begin{bmatrix} u_1(k-n) \\ \vdots \\ u_1(k+i-1) \\ \vdots \\ u_{n_u}(k-n) \\ \vdots \\ u_{n_u}(k+i-1) \end{bmatrix}$$

$$B_{y,i} = \begin{bmatrix} b_{y_1,i} \\ \vdots \\ b_{y_{n_y},i} \end{bmatrix}$$

Similarly, the prediction-equation-set learning and generation unit 12000 is able to generate the prediction-equation set 2500 that use cost variables "$c_1, c_2, \ldots$" of i steps ahead at the k-th step as dependent variables by an equation 5 below using matrices $A_{x,c,i}$, $A_{u,c,i}$, and $B_{c,i}$.

$$C(k+i) = A_{x,c,i} \times X(k-n,k) + A_{u,c,i} \times U(k-n,k+i-1) + B_{c,i} \quad \text{[Equation 5]}$$

The independent variables in the equation 4 and the equation 5 do not include the following variables.

(1) Future state variables "$x_j(k+l)$ (j=1, ..., $n_x$, l=1, ..., i)"
(2) Future cost variables "$c_j(k+l)$ (j=1, ..., $n_c$, l=1, ..., i)"
(3) Future control variables "$y_j(k+l)$ (j=1, ..., $n_y$, l=1, ..., i)"

That is, control variables and cost variable at a point of time in the future do not depend on state variables, cost variables, and control variables at another point of time in the future. This feature produces an effect in which after-mentioned constraint (the inequality 12) can be described concisely. As a result, solution processing of the mathematical programming problem 2800 becomes easy.

Further, among the elements in each column in a matrix $[A_{u,y,i} \ A_{u,c,i}]^T$ that is made by concatenating the matrix $A_{u,y,i}$ and the matrix $A_{u,c,i}$, the number of non-zero elements is equal to or greater than 2.

At least one of such elements is conditioned to be an element in a column of the matrix $A_{u,y,i}$.

The feature that a non-zero element is an element in a column of the matrix $A_{u,y,i}$ means that the operation variable having the element as a coefficient thereof is able to change a control variable. The feature that a plurality of such non-zero elements exist means that, on the basis of a single operation variable, a plurality of control variables can be changed at the same time. That is, it becomes possible to describe relationships between the control variables.

The feature that a non-zero element is an element in the column in the matrix $A_{u,c,i}$ means that the operation variable also has an influence on a cost variable. That is, it becomes possible to describe relationships between a control variable and a cost variable.

Furthermore, as indicated by an after-mentioned objective function (the equation 13), using a cost variable as an independent variable in the objective function enables determination of an operation variable with cost taken into consideration. As a result, it becomes possible to determine an operation variable that achieves an objective at a minimum cost.

The prediction-equation set 2500 is configured with the equation 4 and the equation 5. The prediction-equation-set conversion unit 14100 (FIG. 9) may simplify the prediction-equation set 2500 (create the prediction-equation set 2501) appropriately. The mathematical-programming-problem formulation unit 14210 (FIGS. 10 to 12) is able to construct the predictive-control model by using the prediction-equation set 2501.

Next, information input from the input device 22000 (setting values ($Y_{SV}(k+i)$)) for the control variables "$y_1, y_2, \ldots$" of i steps ahead in the future at the k-th step is expressed by an equation 6 below. However, in the present invention, it is not required to give corresponding setting values ($y_{1,SV}(k+i)$, $y_{2,SV}(k+i)$, ...) to all the control variables, and a portion of the setting values may be given.

$$Y_{SV}(k+i) = [Y_{1,SV}(k+i) \ldots y_{n_y,SV}(k+i)]^T \quad \text{[Equation 6]}$$

When setting values are given to the control variables "$y_1, y_2, \ldots$" of i steps ahead at the k-th step, allowable deviations ($E(k+i)$) are expressed by a following equation 7. However, in the present invention, it is not required to give corresponding allowable deviations ($e_1(k+i)$, $e_2(k+i)$, ...) to all the control variables, and a portion of the allowable deviations may be given.

$$E(k+i) = [e_1(k+1) \ldots e_{n_y}(k+i)]^T, e_j(k+i) \geq 0 \text{ for } j=1 \ldots n_y \quad \text{[Equation 7]}$$

With respect to the allowable deviations expressed by the equation 7, deviation weighting coefficients ($W_e(k+i)$) are expressed by an equation 8 below. The deviation weighting coefficients are determined on the basis of the input information 2200 (priorities) from the input device 22000. For control variables with high priorities, large values are set to deviation weighting coefficients ($w_{e1}(k+i)$, $w_{e2}(k+i)$, ...) corresponding to the control variables. On the basis of this operation, the mathematical-programming-problem formulation unit 14210 is able to determine operation variables with priorities taken into consideration.

$$W_e(k+i) = [w_{e_1}(k+i) \ldots w_{e_{n_y}}(k+i)], \quad \text{[Equation 8]}$$
$$w_{e_j}(k+i) \geq 0 \text{ for } j = 1 \ldots n_y$$

With respect to the cost variables "$c_1, c_2, \ldots$" of i steps ahead at the k-th step, cost coefficients ($W_c(k+i)$) are expressed by an equation 9 below. The cost coefficients are coefficients ($w_{c1}(k+i)$, $w_{c2}(k+i)$, ...) to treat a plurality of cost variables "$c_1, c_2, \ldots$" in a uniform manner.

$$W_c(k+i) = [w_{c_1}(k+i) \ldots w_{c_{n_c}}(k+i)] \quad \text{[Equation 9]}$$

Furthermore, with respect to the control variables "$y_1, y_2, \ldots$" of i steps ahead at the k-th step, the input information 2200 (constraints) input from the input device 22000 are expressed by an equation 10 below. In the equation 10, constraints on the minimum side are "$Y_{MIN}(k+i)$", and constraints on the maximum side are "$Y_{MAX}(k+i)$". Each of the constraints ("$y_{1,MIN}(k+i)$, $y_{2,MIN}(k+i)$, ..." and "$y_{1,MAX}(k+i)$, $y_{2,MAX}(k+i)$, ...") corresponding to the control variables may be given negative infinity as a lower limit or positive infinity as an upper limit, as needed.

$$Y_{MIN}(k+i) = [y_{1,MIN}(k+i) \ldots y_{n_y,MIN}(k+i)]^T$$

$$Y_{MAX}(k+i) = [y_{1,MAX}(k+i) \ldots y_{n_y,MAX}(k+i)]^T \quad \text{[Equation 10]}$$

Similarly, with respect to the operation variables "$u_1, u_2, \ldots$" of i steps ahead at the k-th step, the input information 2200 (constraints) input from the input device 22000 is expressed by an equation 11 below. In the equation 11, constraints on the minimum side are "$U_{MIN}(k,k+i-1)$", and constraints on the maximum side are "$U_{MAX}(k,k+i-1)$". Each of the constraints ("$u_{1,MIN}(k)$, $u_{1,MIN}(k+1)$, ..." and "$u_{1,MAX}(k)$, $u_{1,MAX}(k+1)$, ...") corresponding to the control variables may be given negative infinity as a lower limit or positive infinity as an upper limit, as needed.

$$U_{MIN}(k,k+i-1) = [u_{1,MIN}(k) \ldots u_{1,MIN}(k+i-1) \ldots$$
$$u_{n_u,MIN}(k) \ldots u_{n_u,MIN}(k+i-1)]^T$$

$$U_{MAX}(k,k+i-1) = [u_{1,MAX}(k) \ldots u_{1,MAX}(k+i-1) \ldots$$
$$u_{n_u,MAX}(k) \ldots u_{n_u,MAX}(k+i-1)]^T \quad \text{[Equation 11]}$$

By using the constraints expressed by the equations 6, 7, 10, and 11, constraint inequalities generated by the constraint-inequality generation unit 14212 can be expressed by an inequality 12 below.

$$Y_{SV}(k+i) - E(k+i) \le Y(k+i) \le Y_{SV}(k+i) + E(k+i)$$

$$Y_{MIN}(k+i) \le Y(k+i) \le Y_{MAX}(k+i)$$

$$U_{MIN}(k,k+i-1) \le U(k,k+i-1) \le U_{MAX}(k,k+i-1) \quad \text{[Inequality 12]}$$

The magnitude relations expressed using matrices in the inequality 12 indicate magnitude relations between respective elements in the matrices. For example, the first element in the first magnitude relation inequality of the inequality 12 is "$y_{1,SV}(k+i) - e_1(k+i) \le y_1(k+i) \le y_{1,SV}(k+i) + e_1(k+i)$".

The objective function generated by the objective-function generation unit 14214 by using the equations 8 and 9 can be expressed by an equation 13 below.

$$J(k+i) = \quad \text{[Equation 13]}$$
$$w_{c_1}(k+1) \times c_1(k+1) + \ldots + w_{c_{n_c}}(k+1) \times c_{n_c}(k+1) +$$
$$w_{c_1}(k+i) \times c_1(k+i) + \ldots + w_{c_{n_c}}(k+i) \times c_{n_c}(k+i) +$$
$$w_{e_1} \times e_1(k+i) + \ldots + w_{e_{n_y}} \times e_{n_y}(k+i) =$$
$$W_c(k+1) \times C(k+1) + \ldots + W_c(k+i) \times C(k+i) +$$
$$W_e(k+i) \times E(k+i) =$$
$$\sum_{j=1}^{i} W_c(k+j) \times C(k+j) + W_e(k+i) \times E(k+i)$$

A mathematical-programming-problem calculation unit 14220 may calculate a vector of operation variables $U(k,k+i-1)$ that minimizes the objective function expressed by the equation 13 by using the inequality 12 as constraint inequalities.

In the equation 6, setting values of i steps ahead at the k-th step are given. However, setting values from the step after one step of the k-th step to the i steps ahead at the k-th step may be given consecutively or intermittently.

As described above, the mathematical-programming-problem formulation unit 14210, by using the prediction-equation set 2500 learned and generated by the prediction-equation-set learning and generation unit 12000, constructs the predictive-control model for control. As a result, the information processing device 10000 becomes capable of performing predictive control corresponding to the input information 2200 (for example, setting values, constraints, priorities).

Next, with reference to FIG. 13, formulation in the mathematical-programming-problem formulation unit 14210 and calculation in the mathematical-programming-problem calculation unit 14220 will be described by using specific values.

First, it is assumed that the equations 4 to 11 are specifically expressed by equations 14 to 21 described below.

$$\begin{bmatrix} y_1(k+1) \\ y_2(k+1) \end{bmatrix} = \begin{bmatrix} 1 \\ -2 \end{bmatrix} \times u_1(k) + \begin{bmatrix} 0 \\ 10 \end{bmatrix} \quad \text{[Equation 14]}$$

$$c_1(k+1) = 1 \times u_1(k) \quad \text{[Equation 15]}$$

$$Y_{SV}(k+1) = [\, 3 \quad 2 \,]^T \quad \text{[Equation 16]}$$

$$E(k+1) = [\, e_1(k+1) \quad e_2(k+1) \,]^T \quad \text{[Equation 17]}$$

$$W_e(k+1) = [\, 1 \quad 1 \,] \quad \text{[Equation 18]}$$

$$W_{c_1}(k+1) = 1 \quad \text{[Equation 19]}$$

$$Y_{MIN}(k+1) = [\, 0 \quad 0 \,]^T \quad \text{[Equation 20]}$$
$$Y_{MAX}(k+1) = [\, 5 \quad 10 \,]^T$$

$$U_{MIN}(k) = 0 \quad \text{[Equation 21]}$$
$$U_{MAX}(k) = 5$$

Figure 13:
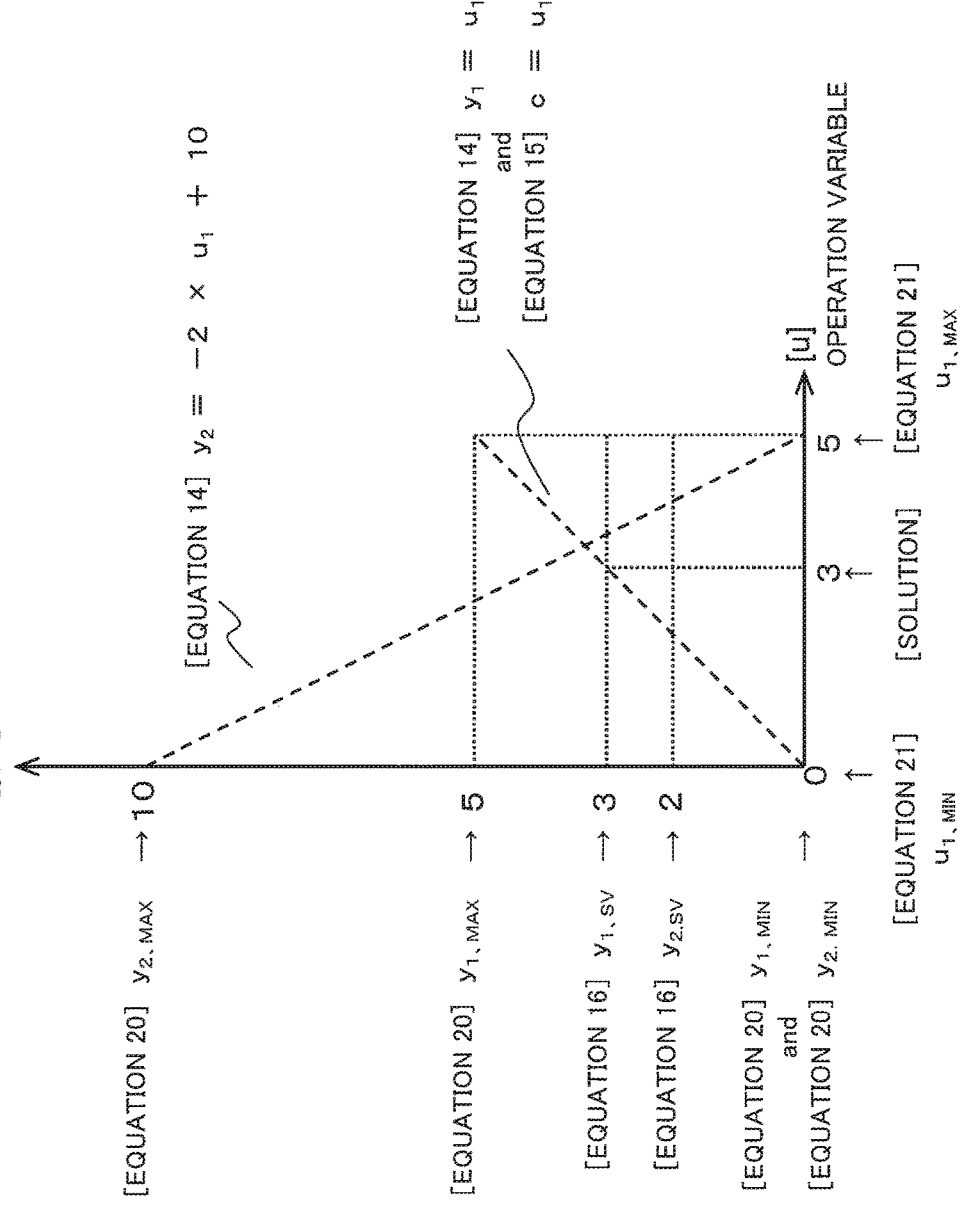
FIG. 13 is a diagram for a description of formulation in the mathematical-programming-problem formulation unit and calculation in a mathematical-programming-problem calculation unit.

FIG. 13 illustrates specific values of the equations.

Based on the equations, the inequality 12 and the equation 13 become an inequality 22 and an equation 23 below, respectively.

[1st]      [Inequality 22]
$$3 - e_1(k+1) \le 1 \times u_1(k) + 0 \le 3 + e_1(k+1)$$
$$3 - e_2(k+1) \le (-2) \times u_1(k) + 10 \le 2 + e_2(k+1)$$
[2nd]
$$0 \le 1 \times u_1(k) + 0 \le 5$$
$$0 \le (-2) \times u_1(k) + 10 \le 10$$
[3rd]
$$0 \le u_1(k) \le 5$$

$$J(k+1) = 1 \times (1 \times u_1(k)) + [\, 1 \quad 1 \,] \times \begin{bmatrix} e_1(k+1) \\ e_2(k+1) \end{bmatrix} \quad \text{[Equation 23]}$$

According to the equation 14, the matrix $A_{u,y,1}$ becomes a matrix $A_{u,y,1} = [1 -2]^T$. According to the equation 15, the matrix $A_{u,c,1}$ becomes a matrix $A_{u,c,1} = [1]$.

Therefore, the elements of rows of a matrix $[A_{u,y,1} \; A_{u,c,1}]^T = [1 -2 \; 1]^T$ that is made by concatenating the matrix $A_{u,y,1}$ and the matrix $A_{u,c,1}$ are all non-zero elements.

Therefore, the operation variable $u_1(k)$ is capable of changing all of two control variables "$y_1(k+1), y_2(k+1)$" and a cost variable $c_1(k+1)$. The equations are an example of the prediction-equation set 2500 capable of determining operation variables with cost taken into consideration.

Using the inequality 22 as constraint inequalities, the mathematical-programming-problem formulation unit 14210 calculates an operation variable $u_1(k)$ that minimizes the objective function expressed by the equation 23 to obtain "$u_1(k)=3$". In such a way, the mathematical-programming-problem formulation unit 14210 is capable of actually obtaining the operation variable that minimizes the cost variable $c_1(k+1)$, which is an independent variable in the objective function.

The prediction equations and the objective function described above are merely examples. The present invention is not limited to the examples. For example, the prediction functions may be non-linear functions. The objective function may also be a non-linear function. The mathematical-programming-problem calculation unit 14220 of the present invention may solve a problem using a solution method and solver for the mathematical programming problem 2800 that are suited for characteristics of the formulated mathematical programming problem 2800.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-189500, filed on Sep. 12, 2013, the disclosure of which is incorporated herein in its entirety by reference.

The whole or part of the exemplary embodiments disclosed above can be described as, but not limited to, the following supplementary notes.

(Supplementary Note 1)

An information processing device, includes:

an information accumulation unit which receives and accumulates control-target information that includes information related to a control target and an environment including the control target;

a prediction-equation-set learning and generation unit which learns and generates a prediction-equation set to be used for determination of an operation quantity of the control target based on the control-target information accumulated in the information accumulation unit; and an operation-quantity determination unit which receives input information needed for determination of an operation quantity of the control target, constructs a predictive-control model of the control target based on the prediction-equation set, the control-target information accumulated in the information accumulation unit, the control-target information received, and the input information, and determines an operation quantity used for control of the control target.

(Supplementary Note 2)

The information processing device according to supplementary note 1, wherein the prediction-equation set includes two or more prediction equations that include, as a dependent variable, a state variable representing a state of a predictive-control model for future or a control variable that is a target for control in the predictive-control model for future, the two or more prediction equations include, a first prediction equation in which an independent variable includes an operation variable indicating an operation of the predictive-control model from a present time onward and includes neither a future state variable nor a future control variable, and the dependent variable is a future control variable, and a second prediction equation in which at least one operation variable indicating an operation of the predictive-control model from the present time onward is a common independent variable with the first prediction equation.

(Supplementary Note 3)

The information processing device according to supplementary note 1 or 2, wherein the operation-quantity determination unit, as the input information, receives one or both of a setting value and a constraint for a control variable that is targeted for control in the predictive-control model.

(Supplementary Note 4)

The information processing device according to supplementary note 3, wherein the operation-quantity determination unit, as the input information, further receives a priority of the control variable representing significance within a plurality of control variables.

(Supplementary Note 5)

The information processing device according to any one of supplementary notes 1 to 4, further includes:

a prediction-equation-set storage unit which stores the prediction-equation set generated by the prediction-equation-set learning and generation unit, wherein the operation-quantity determination unit, for determination of an operation quantity for the control target, uses the prediction-equation set stored in the prediction-equation-set storage unit.

(Supplementary Note 6)

The information processing device according to any one of supplementary notes 1 to 5, further includes:

a predicted-value calculation unit which calculates a predicted value of the control target based on the prediction-equation set stored in the prediction-equation-set storage unit, the received control-target information, and the operation quantity.

(Supplementary Note 7)

The information processing device according to supplementary note 6, wherein the predicted-value calculation unit uses the control-target information stored in the information accumulation unit for calculation of the predicted value.

(Supplementary Note 8)

The information processing device according to supplementary note 6 or 7, further includes:

a predicted-value accumulation unit which accumulates the predicted value;

a prediction-deviation calculation unit which calculates a prediction deviation based on the predicted value accumulated in the predicted-value accumulation unit and the control-target information accumulated in the information accumulation unit, and a relearning decision unit which decides whether or not the prediction-equation-set learning and generation unit performs relearning by using the prediction deviation, wherein the prediction-equation-set learning and generation unit relearns and regenerates the prediction-equation set based on a decision result of the relearning decision unit.

(Supplementary Note 9)

The information processing device according to any one of supplementary notes 1 to 8, wherein the information accumulation unit receives and accumulates a plurality of pieces of control-target information, and the operation-quantity determination unit determines the operation quantities of the plurality of control targets.

(Supplementary Note 10)

The information processing device according to any one of supplementary notes 1 to 9, wherein the operation-quantity determination unit comprises:

a prediction-equation-set conversion unit which converts the prediction-equation set in accordance with a predetermined rule; and an operation-quantity calculation unit which calculates an operation quantity for the control target based on the prediction-equation set converted by the prediction-equation-set conversion unit, the control-target information accumulated in the information accumulation unit, the received control-target information, and the input information.

(Supplementary Note 11)

The information processing device according to supplementary note 10, wherein the operation-quantity calculation unit comprises:

a mathematical-programming-problem formulation unit which formulates a mathematical programming problem expressing the predictive-control model based on the prediction-equation set converted by the prediction-equation-set conversion unit, the control-target information accumulated in the information accumulation unit, the received control-target information, and the input information; and a mathematical-programming-problem calculation unit which performs calculation to solve the mathematical programming problem formulated and determines a calculation result to be the operation quantity.

(Supplementary Note 12)

The information processing device according to supplementary note 11, further includes:

an operation-quantity quality decision unit which decides whether quality of the calculation result calculated by the mathematical-programming-problem calculation unit is good or not; and an operation-quantity selection unit which determines the calculation result to be the operation quantity when a decision result of the operation-quantity quality decision unit is good.

(Supplementary Note 13)

The information processing device according to supplementary note 12, wherein the operation-quantity selection unit, when the operation-quantity quality decision unit decides that a plurality of calculation results are good, selects the operation quantity from the plurality of calculation results based on the input information or a predetermined rule.

(Supplementary Note 14)

The information processing device according to supplementary note 12 or 13, wherein the operation-quantity quality decision unit, when deciding that all the calculation results are not good, instructs the mathematical-programming-problem formulation unit to perform another formulation.

(Supplementary Note 15)

The information processing device according to any one of supplementary notes 1 to 14, wherein the prediction-equation-set learning and generation unit learns and generates the prediction-equation set at a time interval longer than a time interval at which the operation-quantity determination unit determines the operation quantity.

(Supplementary Note 16)

The information processing device according to any one of supplementary notes 1 to 15, wherein the prediction-equation-set learning and generation unit includes, as the prediction-equation set, a plurality of functions each using a future state variable or a future control variable as a dependent variable, wherein the plurality of functions includes, one function uses the future control variable as the dependent variable and includes neither the future state variable nor the future control variable as the independent variable, and another function that uses at least one operation variable from a present time onward as a common independent variable with the one function.

(Supplementary Note 17)

A predictive control method, includes:

receiving control-target information including information related to a control target and an environment including the control target and accumulating the control-target information;

learning and generating a prediction-equation set to be used for determination of an operation quantity of the control target based on the accumulated control-target information; and receiving input information needed for determination of an operation quantity of the control target, constructing a predictive-control model of the control target based on the prediction-equation set, the control-target information accumulated, the control-target information received, and the input information, and determining an operation quantity used for control of the control target.

(Supplementary Note 18)

A non-transitory computer-readable recording medium embodying a program, the program causing an information processing device to perform a method, the method includes:

receiving control-target information including information related to a control target and an environment including the control target and accumulating the control-target information;

learning and generating a prediction-equation set to be used for determination of an operation quantity of the control target based on the accumulated control-target information; and receiving input information needed for determination of an operation quantity of the control target, constructing a predictive-control model of the control target based on the prediction-equation set, the accumulated control-target information, the control-target information received, and the input information, and determining an operation quantity used for control of the control target.

(Supplementary Note 19)

An information processing device, includes:

a predictive control unit that includes:
an information accumulation unit which receives and accumulates control-target information including information on a control target and an environment including the control target;
a prediction-equation-set learning and generation unit which learns and generates a prediction-equation set used for determination of an operation quantity of the control target based on the control-target information accumulated in the information accumulation unit, and
an operation-quantity determination unit which receives input information required for determination of an operation quantity of the control target, constructs a predictive-control model of the control target based on the input information, control-target information accumulated in the information accumulation unit, and the prediction-equation set, and determines a first operation quantity used for control of the control target, and outputs the first operation quantity;

a fixed control unit which determines a second operation quantity used for control of the control target based on an equation that has been input in advance and the control-target information accumulated in the information accumulation unit and outputting the determined second operation quantity; and an operation-quantity selection unit which selects either a first operation quantity from the operation-quantity determination unit or a second operation quantity from the fixed control unit.

(Supplementary Note 20)

The information processing device according to supplementary note 19, includes a plurality of either or both the predictive control unit and/or the fixed control unit, wherein the operation-quantity selection unit selects any one of the one or the plurality of the first operation quantity output from the one or the plurality of the predictive control unit and the one or the plurality of the second operation quantity output from the one or the plurality of fixed control unit.

(Supplementary Note 21)

The information processing device according to supplementary note 19 or 20, further includes:

a display unit which displays, to a user, control-target information accumulated in the information accumulation unit and an operation quantity that the operation-quantity determination unit and the fixed control unit output, wherein the operation-quantity selection unit selects an operation quantity that the user selects out of the first operation quantity output from the predictive control unit and the second operation quantity output from the fixed control unit and output the selected operation quantity.

(Supplementary Note 22)

The information processing device according to supplementary note 19 or 20, further includes:

a unit which calculates a predicted value based on the prediction-equation set that the prediction-equation-set learning and generation unit output and the control-target information that the information accumulation unit accumulates; and a prediction-deviation decision unit which decides a deviation of prediction based on a difference between the predicted value and control-target information that the information accumulation unit accumulates, wherein the operation-quantity selection unit selects any one of the first operation quantity output from the predictive control unit and the second operation quantity output from the fixed control unit, based on the result of the prediction-deviation decision unit.

(Supplementary Note 23)

The information processing device according to supplementary note 19 or 20, further includes:

a control evaluation unit which calculates an evaluation value in accordance with an evaluation function that has been input in advance based on the operation quantity that the predictive control unit and the operation-quantity determination unit output, and deciding a control quantity with a highest evaluation value, wherein the operation-quantity selection unit selects any one of the first operation quantity output from the predictive control unit and the second operation quantity output from the fixed control unit, based on the result of decision of the control evaluation unit.

(Supplementary Note 24)

The information processing device according to supplementary note 23, wherein the control evaluation unit performs decision based on a cost required for operations.

(Supplementary Note 25)

The information processing device according to supplementary note 23, wherein the control evaluation unit performs decision based on a quantity of deviation of the first operation quantity output from the operation-quantity determination unit from the control quantity of the fixed control unit.

(Supplementary Note 26)

The information processing device according to supplementary note 19 or 20, further includes:

a behavior evaluation unit which evaluates behavior based on a difference between the control-target information that the information accumulation unit accumulates and a target value in the input information, wherein the operation-quantity selection unit selects any one of the first operation quantity output from the predictive control unit based on the result of the control evaluation unit and the second operation quantity output from the fixed control unit in accordance with the result of the control evaluation unit, based on evaluation of the behavior evaluation unit.

(Supplementary Note 27)

The information processing device according to supplementary note 19 or 20, further includes:

a prediction-equation evaluation unit which performs evaluation based on an evaluation value of learning calculated by the prediction-equation-set learning and generation unit, wherein the operation-quantity selection unit selects any one of the first operation quantity output from the predictive control unit the prediction-equation evaluation unit and the second operation quantity output from the fixed control unit, based on a result of the prediction-equation evaluation unit.

(Supplementary Note 28)

The information processing device according to supplementary note 27, wherein the prediction-equation evaluation unit performs evaluation based on an information criterion that indicates a likelihood of learning.

(Supplementary Note 29)

The information processing device according to supplementary note 19 or 20, further includes:

a prediction-equation-set evaluation unit which evaluates the prediction-equation set, based on whether or not the prediction-equation set output from the prediction-equation-set learning and generation unit is a controllable prediction equation, wherein the operation-quantity selection unit selects any one of the first operation quantity output from the predictive control unit and the second operation quantity output from the fixed control unit, based on a result of the prediction-equation-set evaluation unit.

(Supplementary Note 30)

The information processing device according to supplementary note 29, wherein the prediction-equation-set evaluation unit performs evaluation based on a number of variables of control quantities included in the prediction equation.

(Supplementary Note 31)

A predictive control method, includes:

receiving and accumulating control-target information including information related to a control target and an environment including the control target;

learning and generating a prediction-equation set used for determination of an operation quantity for the control target based on the accumulated control-target information;

receiving input information required for determination of an operation quantity of the control target, constructing a predictive-control model of the control target based on the input information, the accumulated control-target information, and the prediction-equation set, and determining a first operation quantity used for control of the control target;

outputting the first operation quantity;

determining a second operation quantity used for control of the control target based on an equation that has been input in advance and the accumulated control-target information and outputting the determined second operation quantity; and selecting either the first operation quantity or the second operation quantity.

(Supplementary Note 32)

A non-transitory computer-readable recording medium embodying a program, the program causing an information processing device to perform a method, the method includes:

receiving and accumulating control-target information including information related to a control target and an environment including the control target;

learning and generating a prediction-equation set used for determination of an operation quantity for the control target based on the accumulated control-target information;

receiving input information required for determination of an operation quantity of the control target, constructing a predictive-control model of the control target based on the input information, the accumulated control-target information, and the prediction-equation set, and determining a first operation quantity used for control of the control target;

outputting the first operation quantity;

determining a second operation quantity used for control of the control target based on an equation that has been input in advance and the accumulated control-target information and outputting the determined second operation quantity; and selecting either the first operation quantity or the second operation quantity.

INDUSTRIAL APPLICABILITY

An information processing device of the present invention can be applied to environmental control of buildings, living space, or the like and environmental control in the agricultural, forestry, and fishery industries, the cattle industry, or the like, without being limited to control of industrial processes. The information processing device of the present invention can also be applied to actuation control of a manipulator, a land moving vehicle, a water-surface or underwater moving vehicle, an airborne moving vehicle, or the like. Furthermore, the information processing device of the present invention can also be applied to uses in communication, transportation, ordering and supplying, and financial transactions.

REFERENCE SIGNS LIST

100 Information processing system
101 Information processing system
102 Information processing system
600 Information processing device
610 CPU
620 ROM
630 RAM
640 Internal storage device
650 IOC
660 Input device
670 Display device
680 NIC
700 Storage medium
2100 Control-target information
2200 Input information
2300 Operation quantity
2400 Predicted value
2500 Prediction-equation set
2501 Prediction-equation set
2600 Accumulated information
2700 Calculation result
2800 Mathematical programming problem
2900 Prediction deviation
3000 Decision result
10000 Information processing device
10010 Information processing device
10020 Information processing device
10030 Information processing device
11000 Information accumulation unit
12000 Prediction-equation-set learning and generation unit
13000 Prediction-equation-set storage unit
14000 Operation-quantity determination unit
14100 Prediction-equation-set conversion unit
14200 Operation-quantity calculation unit
14201 Operation-quantity calculation unit
14210 Mathematical-programming-problem formulation unit
14212 Constraint-inequality generation unit
14214 Objective-function generation unit
14216 Allowable-deviation register
14217 Deviation-weighting-coefficient register
14218 Cost-coefficient register
14220 Mathematical-programming-problem calculation unit
14230 Operation-quantity quality decision unit
14240 Operation-quantity selection unit
15000 Predicted-value calculation unit
16000 Predicted-value accumulation unit
17000 Prediction-deviation calculation unit
18000 Relearning decision unit
20000 Surrounding environment
21000 Control target
21001 Control target
2100$n$ Control target
22000 Input device
23000 Output device
30000 Predictive control unit
31000 Fixed control unit
32000 Operation-quantity selection unit
33000 Display unit
34000 Prediction-deviation decision unit
35000 Operation-quantity evaluation unit
36000 Behavior evaluation unit
37000 Prediction-equation evaluation unit

What is claimed is:

1. An information processing system to construct a predictive-control model by using machine learning language, the information processing system comprising:
an information processing device;
an input device; and
an output device,
wherein the information processing device comprises:
at least one processor, and
at least one memory connected to the at least one processor, the at least one memory configured to store a program and the at least one processor configured to read the program and configured to operate as instructed by the program to:
receive and accumulate control-target information that includes information related to a control target and an environment including the control target;
learn and generate a prediction-equation set to be used for determination of an operation quantity of the control target based on the accumulated control-target information;
receive input information needed for determination of an operation quantity of the control target from the input device;
construct a predictive-control model of the control target based on the prediction-equation set, the accumulated control-target information, the received control-target information, and the input information;
determine an operation quantity used for control of the control target; and
output the operation quantity to the output device.

2. The information processing system according to claim 1, wherein
the prediction-equation set
includes
two or more prediction equations that include, as a dependent variable, a state variable representing a state of a predictive-control model for future or a control variable that is a target for control in the predictive-control model for future,
the two or more prediction equations include,
a first prediction equation in which an independent variable includes an operation variable indicating an operation of the predictive-control model from a present time onward and includes neither a future state variable nor a future control variable, and the dependent variable is a future control variable, and
a second prediction equation in which at least one operation variable indicating an operation of the predictive-control model from the present time onward is a common independent variable with the first prediction equation.

3. The information processing system according to claim 1, wherein the at least one processor is further configured to receive, as the input information,
one or both of a setting value and a constraint for a control variable that is targeted for control in the predictive-control model.

4. The information processing system according to claim 3, wherein the at least one processor is further configured to receive, as the input information,
a priority of the control variable representing significance within a plurality of control variables.

5. The information processing system according to claim 1, wherein the at least one memory is further configured to store
the prediction-equation set,
wherein
for determination of an operation quantity for the control target, the at least one processor is further configured to use the prediction-equation set stored in the at least one memory.

6. The information processing system according to claim 1, wherein the at least one processor is further configures to calculate
a predicted value of the control target based on the prediction-equation set stored in the at least one memory, the received control-target information, and the operation quantity.

7. The information processing device according to claim 6, wherein the at least one processor is further configured to use
the accumulated control-target information for calculation of the predicted value.

8. The information processing device according to claim 6, wherein the at least one processor is further configured to:
accumulate the predicted value;
calculate a prediction deviation based on the accumulated predicted value and the accumulated control-target information;
decide whether or not to perform relearning by using the prediction deviation; and
the prediction-equation set based on deciding to perform relearning by using the prediction deviation.

9. The information processing system according to claim 1, wherein the at least one processor is further configured to:
receive and accumulate a plurality of pieces of control-target information, and
determine the operation quantities of the plurality of control targets.

10. The information processing system according to claim 1, wherein the at least one processor is further configured to:
convert the prediction-equation set in accordance with a predetermined rule; and
calculate an operation quantity for the control target based on the converted prediction-equation set, the accumulated control-target information, the received control-target information, and the input information.

11. The information processing system according to claim 10, wherein the at least one processor is further configured to:
formulate a mathematical programming problem expressing the predictive-control model based on the converted prediction-equation set, the accumulated control-target information, the received control-target information, and the input information;
calculate the formulated mathematical programming problem; and
determine a calculation result to be the operation quantity.

12. The information processing system according to claim 11, wherein the at least one processor is further configured to:
decide whether a quality of the calculation result is good or not; and
determine the calculation result to be the operation quantity when a decision result is good.

13. The information processing system according to claim 12, wherein the at least one processor is further configured to select, in response to deciding that a plurality of calculation results are good, the operation quantity from the plurality of calculation results based on the input information or a predetermined rule.

14. The information processing system according to claim 12, wherein the at least one processor is further configured to perform, in response to deciding that all the calculation results are not good, another formulation.

15. The information processing system according to claim 1, wherein the at least one processor is further configured to learn and generate the prediction-equation set at a time interval longer than a time interval for determining the operation quantity.

16. The information processing system according to claim 1, wherein the prediction-equation set includes a plurality of functions each using a future state variable or a future control variable as a dependent variable, and wherein the plurality of functions includes, one function that uses the future control variable as the dependent variable and includes neither the future state variable nor the future control variable as the independent variable, and another function that uses at least one operation variable from a present time onward as a common independent variable with the one function.

17. A predictive control method to construct a predictive-control model by using machine learning language, the predictive control method comprising:

receiving control-target information including information related to a control target and an environment including the control target and accumulating the control-target information;

learning and generating a prediction-equation set to be used for determination of an operation quantity of the control target based on the accumulated control-target information; and receiving input information needed for determination of an operation quantity of the control target, constructing a predictive-control model of the control target based on the prediction-equation set, the accumulated control-target information, the received control-target information, and the input information, determining an operation quantity used for control of the control target, and outputting the operation quantity.

18. A non-transitory computer-readable recording medium embodying a program to construct a predictive-control model by using machine learning language, the program causing an information processing device to perform a method, the method comprising:

receiving control-target information including information related to a control target and an environment including the control target and accumulating the control-target information;

learning and generating a prediction-equation set to be used for determination of an operation quantity of the control target based on the accumulated control-target information;

receiving input information needed for determination of an operation quantity of the control target;

constructing a predictive-control model of the control target based on the prediction-equation set, the accumulated control-target information, the received control-target information, and the input information;

determining an operation quantity used for control of the control target; and outputting the operation quantity.

* * * * *